United States Patent
Novaes et al.

(10) Patent No.: US 6,823,355 B1
(45) Date of Patent: Nov. 23, 2004

(54) SYNCHRONOUS REPLICATION OF TRANSACTIONS IN A DISTRIBUTED SYSTEM

(75) Inventors: Marcos N. Novaes, Hopewell Junction, NY (US); Gregory D. Laib, Kingston, NY (US); Rosario A. Uceda-Sosa, Hartsdale, NY (US); Anton A. Prenneis, Jr., Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 09/583,370

(22) Filed: May 31, 2000

(51) Int. Cl.[7] .............................................. G06F 15/16
(52) U.S. Cl. ...................... 709/201; 709/208; 709/248; 707/10; 707/201; 707/205; 714/4; 717/128; 719/315
(58) Field of Search ................................ 709/200, 201, 709/203

(56) References Cited

U.S. PATENT DOCUMENTS

| | | | |
|---|---|---|---|
| 4,714,992 A | 12/1987 | Gladney et al. ............ 364/200 |
| 4,766,534 A | 8/1988 | DeBenedictis .............. 364/200 |
| 4,766,566 A | 8/1988 | Chuang ...................... 364/900 |
| 5,293,619 A | 3/1994 | Dean .......................... 395/650 |
| 5,307,483 A | 4/1994 | Knipfer et al. ............. 395/575 |
| 5,430,851 A | 7/1995 | Hirata et al. ................ 395/375 |
| 5,481,747 A | 1/1996 | Kametani ................... 395/800 |
| 5,664,214 A | 9/1997 | Taylor et al. ............ 395/800.2 |
| 5,737,601 A * | 4/1998 | Jain et al. |
| 5,740,433 A * | 4/1998 | Carr et al. |
| 5,748,958 A | 5/1998 | Badovinatz et al. ......... 395/670 |
| 5,774,668 A | 6/1998 | Choquier et al. ...... 395/200.53 |
| 5,787,301 A | 7/1998 | Arakawa et al. ......... 395/800.2 |
| 5,828,880 A | 10/1998 | Hanko ........................ 395/676 |
| 5,924,094 A * | 7/1999 | Sutter |
| 5,941,949 A | 8/1999 | Pedersen .................... 709/227 |
| 5,951,694 A | 9/1999 | Choquier et al. ............. 714/15 |
| 6,122,630 A * | 9/2000 | Strickler et al. |
| 6,163,855 A * | 12/2000 | Shrivastava et al. |
| 6,266,669 B1 * | 7/2001 | Brodersen et al. |
| 6,324,571 B1 * | 11/2001 | Hacherl |
| 6,405,220 B1 * | 6/2002 | Brodersen et al. |

* cited by examiner

*Primary Examiner*—Hosain Alam
*Assistant Examiner*—Young Won
(74) *Attorney, Agent, or Firm*—Lawrence D. Cutter, Esq.; Blanche E. Schiller, Esq.; Heslin Rothenberg Farley & Mesiti P.C.

(57) ABSTRACT

The management and use of replicated distributed transactions is facilitated. A distributed synchronous transaction system protocol is provided to manage the replication of distributed transactions for client application instances. The distributed synchronous transaction system allows transactions to be replicated without having the client application instances be aware of other instances to receive the transaction. Further, if a failure occurs during processing of a distributed replicated transaction, the distributed synchronous transaction system manages the recovery of the failure.

45 Claims, 22 Drawing Sheets

ACTIVATION – FIRST PHASE

ACTIVATION – SECOND PHASE

SYNCHRONOUS REPLICATION OF TRANSACTIONS IN A DISTRIBUTED SYSTEM

CROSS-REFERENCE TO RELATED APPLICATIONS

This application contains subject matter which is related to the subject matter of the following applications, each of which is assigned to the same assignee as this application, and each of which is hereby incorporated herein by reference in its entirety:

"METHOD, SYSTEM AND PROGRAM PRODUCTS FOR MANAGING PROCESSING GROUPS OF A DISTRIBUTED COMPUTING ENVIRONMENT," Novaes et al., Ser. No. 09/584,259, filed herewith;

"METHOD, SYSTEM AND PROGRAM PRODUCTS FOR RECOVERING FROM FAILURES WITHIN A SHARED NOTHING DISTRIBUTED COMPUTING ENVIRONMENT," Novaes et al., Ser. No. 09/583,784, filed herewith;

"METHOD, SYSTEM AND PROGRAM PRODUCTS FOR SERIALIZING REPLICATED TRANSACTIONS OF A DISTRIBUTED COMPUTING ENVIRONMENT," Novaes et al., Ser. No. 09/584,481, filed herewith; and "METHOD, SYSTEM AND PROGRAM PRODUCTS FOR MANAGING A CLUSTERED COMPUTING ENVIRONMENT," Novaes et al., Ser. No. 09/583,677, filed May 31, 2000.

TECHNICAL FIELD

This invention relates, in general, to distributed systems, and in particular, to managing a distributed synchronous transaction system.

BACKGROUND ART

Distributed systems are highly-available, scalable systems that are utilized in various situations, including those situations that require a high-throughput of work or continuous or nearly continuous availability of the system.

One type of a distributed system is a distributed synchronous transaction system, which is a system that performs distributed synchronous transactions on behalf of distributed clients. A distributed synchronous transaction is a transaction that is initiated substantially immediately when it is requested by a client application, and which in turn, is notified of the success of the transaction substantially immediately following the transaction's completion.

Although there are facilities today for managing distributed synchronous transactions, these facilities tend to be complicated. Thus, there is still a need for capabilities to facilitate the management of synchronous transactions in a distributed system.

SUMMARY OF THE INVENTION

The shortcomings of the prior art are overcome and additional advantages are provided through the provision of a method of performing synchronous replication of transactions of a distributed computing environment. The method includes, for instance, initiating, by an instance of a client application of the distributed computing environment, a transaction within the distributed computing environment; and replicating the transaction to at least one other instance of the client application, wherein existence of the other instance is hidden from the instance initiating the transaction.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with aspects of the present invention, distributed synchronous transactions are executed and managed. The distributed synchronous transactions are utilized by distributed client applications of a distributed computing environment.

Figure 1:
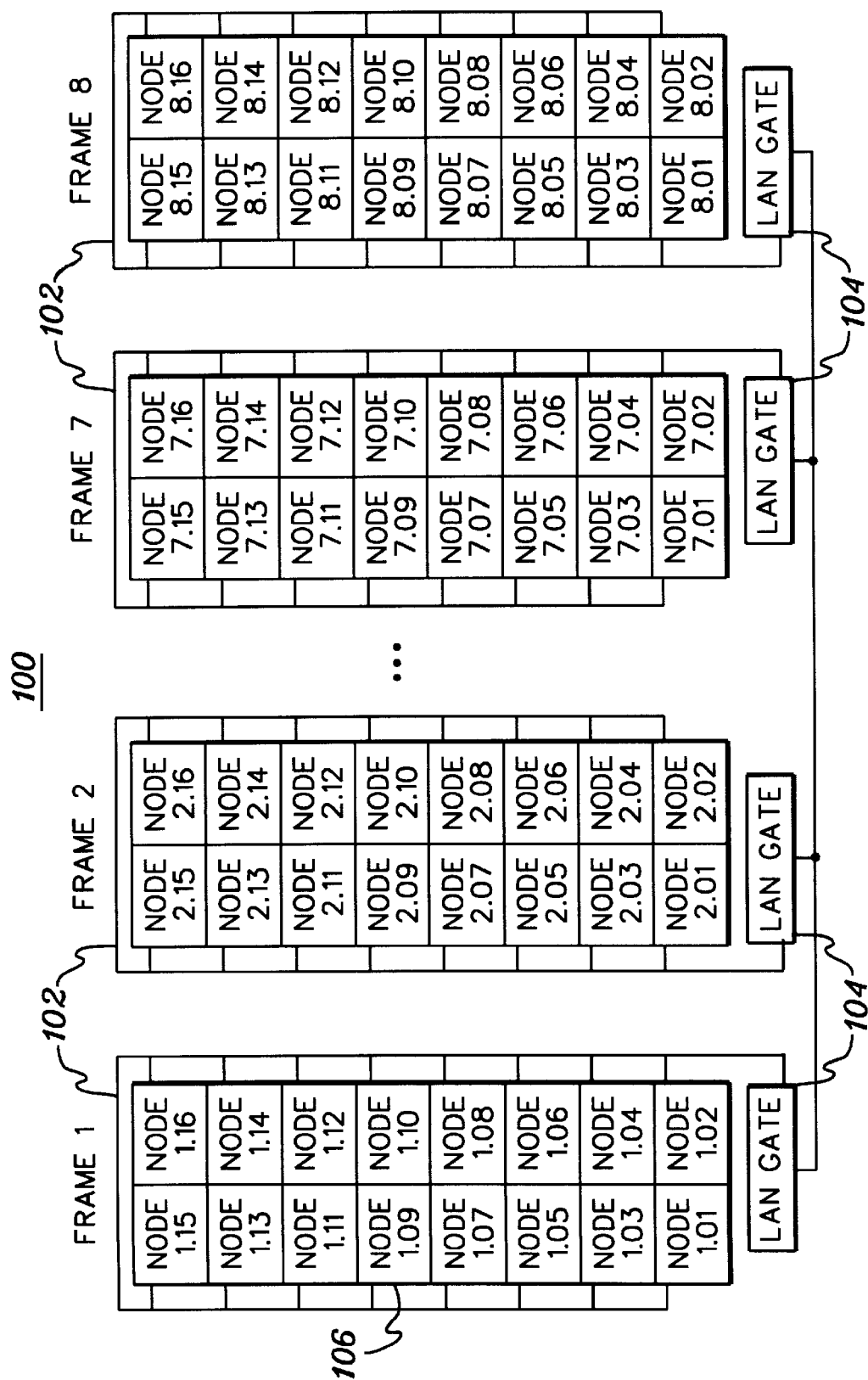
FIG. 1 depicts one example of a computing environment incorporating and using aspects of the present invention.

One example of a distributed computing environment incorporating and using aspects of the present invention is depicted in FIG. 1 and described herein. A distributed computing environment 100 includes, for instance, a plurality of frames 102 coupled to one another via a plurality of LAN gates 104. Frames 102 and LAN gates 104 are described in detail below.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame via, for example, an internal LAN connection. Additionally, each frame is coupled to the other frames via LAN gates 104.

As examples, each LAN gate 104 includes either a RISC/6000 computer, any computer network connection to the LAN, or a network router. However, these are only examples. It will be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. Further, a heterogeneous environment can include and utilize the invention, in which one or more of the nodes and/or operating systems of the environment are distinct from other nodes or operating systems of the environment. The nodes of such a heterogeneous environment interoperate, in that they collaborate and share resources with each other, as described herein.

Figure 2:
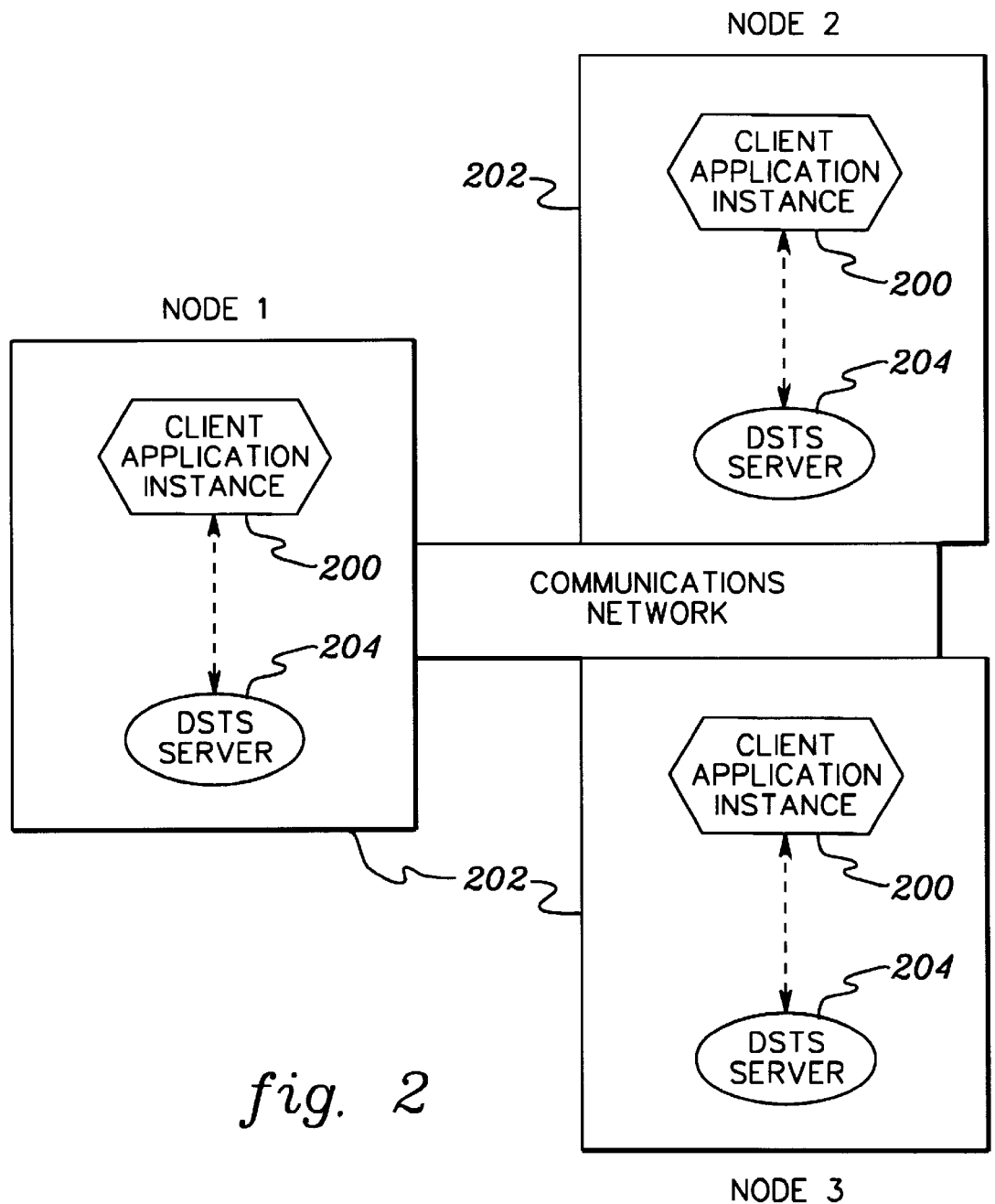
FIG. 2 depicts one example of various components of several nodes of FIG. 1, in accordance with an aspect of the present invention.

Further details regarding the nodes of a distributed computing environment are described with reference to FIG. 2. In one example, a distributed client application 200 runs on a plurality of nodes 202. In particular, an instance of the client application runs substantially simultaneously on each of the plurality of nodes, which includes three nodes in this specific example. (It will be apparent to one skilled in the art that the client application can run on any number of the nodes of the environment, including only one node.)

In one embodiment, the client application instances are coupled to a distributed synchronous transaction system (DSTS), which enables the application instances, in accordance with an aspect of the present invention, to participate in the synchronous replication of transactions. By using the distributed synchronous transaction system, a client instance is able to participate in synchronous replication of transactions, even though the client application instance has no direct knowledge of any other instances of the application. The distributed synchronous transaction system includes one or more DSTS instances (e.g., computer programs) 204 that run on one or more nodes. In one example, a DSTS instance is executed on each node that has a client application instance interested in participating in a distributed transaction. Each DSTS instance is coupled to one or more instances of one or more client applications.

When the DSTS instance is loaded into a node's memory and executed, it is perceived as a server process, which serves its corresponding client application process (or processes). It is the DSTS system that performs a distributed synchronous transaction on behalf of a client application. When the transaction is requested by the client, it is initiated substantially immediately by a DSTS server. Further, the client is substantially immediately notified of the outcome (e.g., success, failure) of the transaction, upon completion of the transaction.

A collection of one or more client application instances participating in the execution of a distributed synchronous transaction is referred to as a replicated group of client application instances. This group is distinct from other forms of groups in a distributed system, since the members of the replicated group have no direct knowledge of one another. Instead, the group is implicitly formed, when a client application instance diverts a flow of update operations to be replicated to one or more other client application instances.

Figure 3:
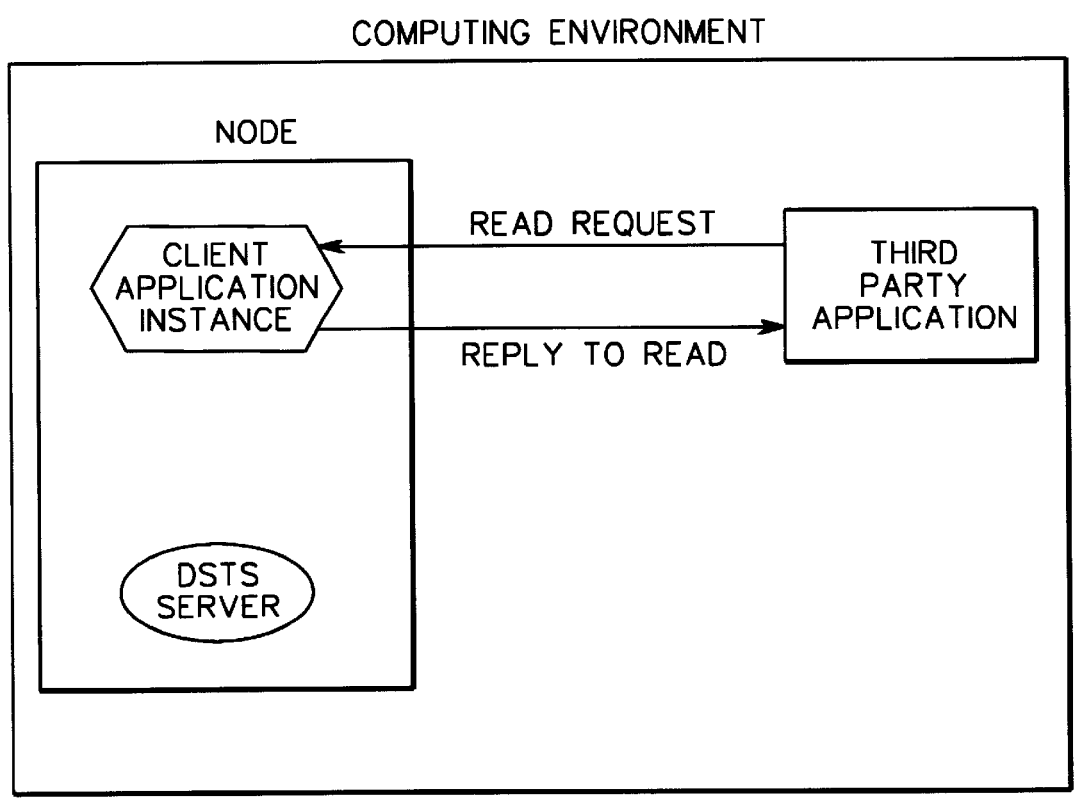
FIG. 3 depicts one embodiment of a computing environment in which a client application instance replies to a request of a third party application without using a DSTS server, in accordance with an aspect of the present invention.
Figure 4:
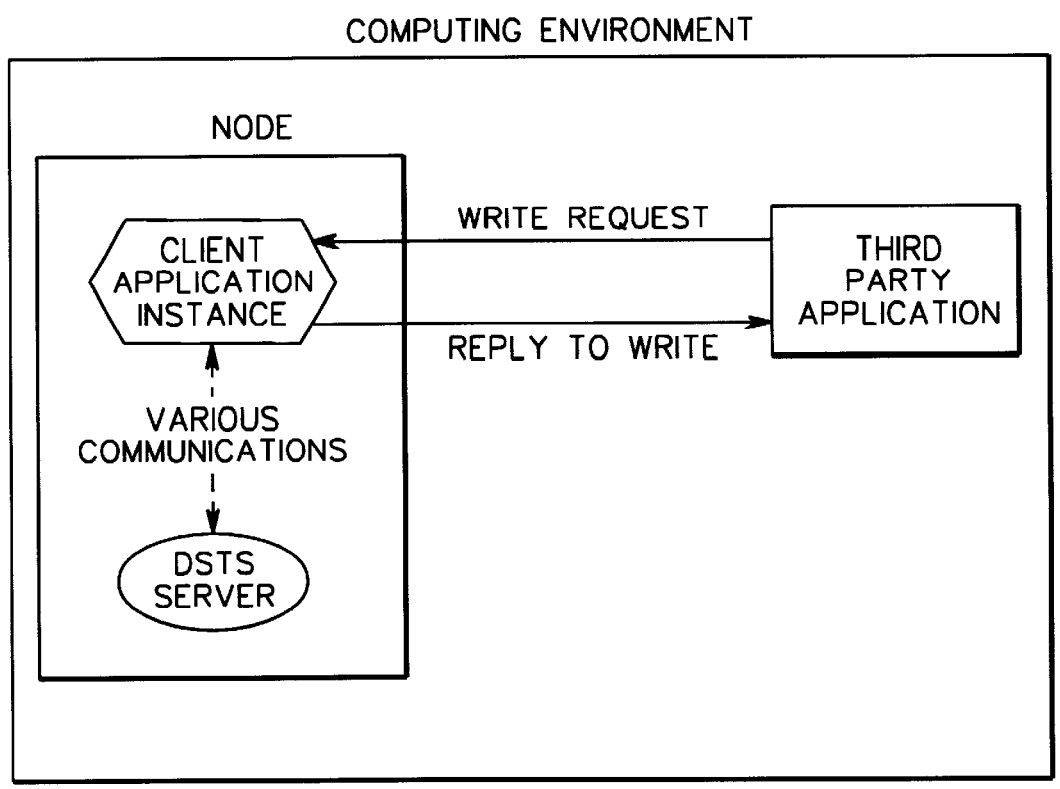
FIG. 4 depicts one embodiment of a computing environment in which a client application instance uses a DSTS server to reply to a request of the third party application, in accordance with an aspect of the present invention.

In particular, the client application diverts the flow of operations, which modify its persistent (stored) or runtime (not stored) state. These update operations are classified as write operations. Any other transaction which does not modify the state of the client application can be termed a query, or read transaction. In accordance with an aspect of the present invention, client applications perform write operations as distributed synchronous transactions, which provides each copy of the client application with a consistent, or identical state. Such capability in turn makes possible for any copy of the application to respond to queries (read operations) to its state without having to redirect the query to any of the other replicas. In other words, client applications can service read operations locally without using a DSTS server (see FIG. 3), while write operations are replicated to other instances of the client application, and thus, use DSTS (see FIG. 4), as described in further detail below. This architecture is optimal for, but not limited to, systems which are read intensive, and that exhibit a low rate of write operations.

Figure 5:
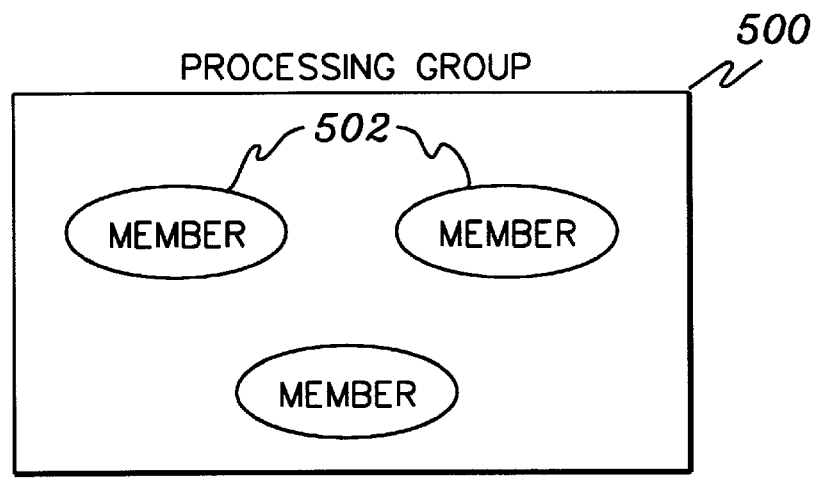
FIG. 5 depicts one example of processing group, used in accordance with an aspect of the present invention.

The flow of update operations is diverted by a client application via, for instance, a DSTS protocol used by the client application. One feature of this protocol, in accordance with an aspect of the present invention, includes membership in one or more processing groups. A processing group 500 (FIG. 5) includes one or more members 502. Each member, in this example, is a DSTS server. Thus, for each client application instance of a replicated group, there is a corresponding DSTS server in a given processing group (a.k.a., a group). For example, if a replicated group includes Client Application Instances A and B, then a processing group includes DSTS Servers A and B, which are coupled to Application Instances A and B, respectively. This allows the processing group to handle the replication of transactions for the client applications of the replicated group, and enables the replication to be transparent to those client applications.

Each member of a processing group is ensured a consistent view of the group's state data. The data is kept consistent because it is only updated by well-defined group protocols. Examples of the protocols include admission to a group, including activation of the group and joining the group, and exclusion from the group, each of which is described in detail below. Further details regarding the management of a processing group are discussed in U.S. Pat. No. 5,748,958 entitled "System For Utilizing Batch Requests To Present Membership Changes To Process Groups," issued on May 5, 1998, which is hereby incorporated herein by reference in its entirety.

Figure 6A:
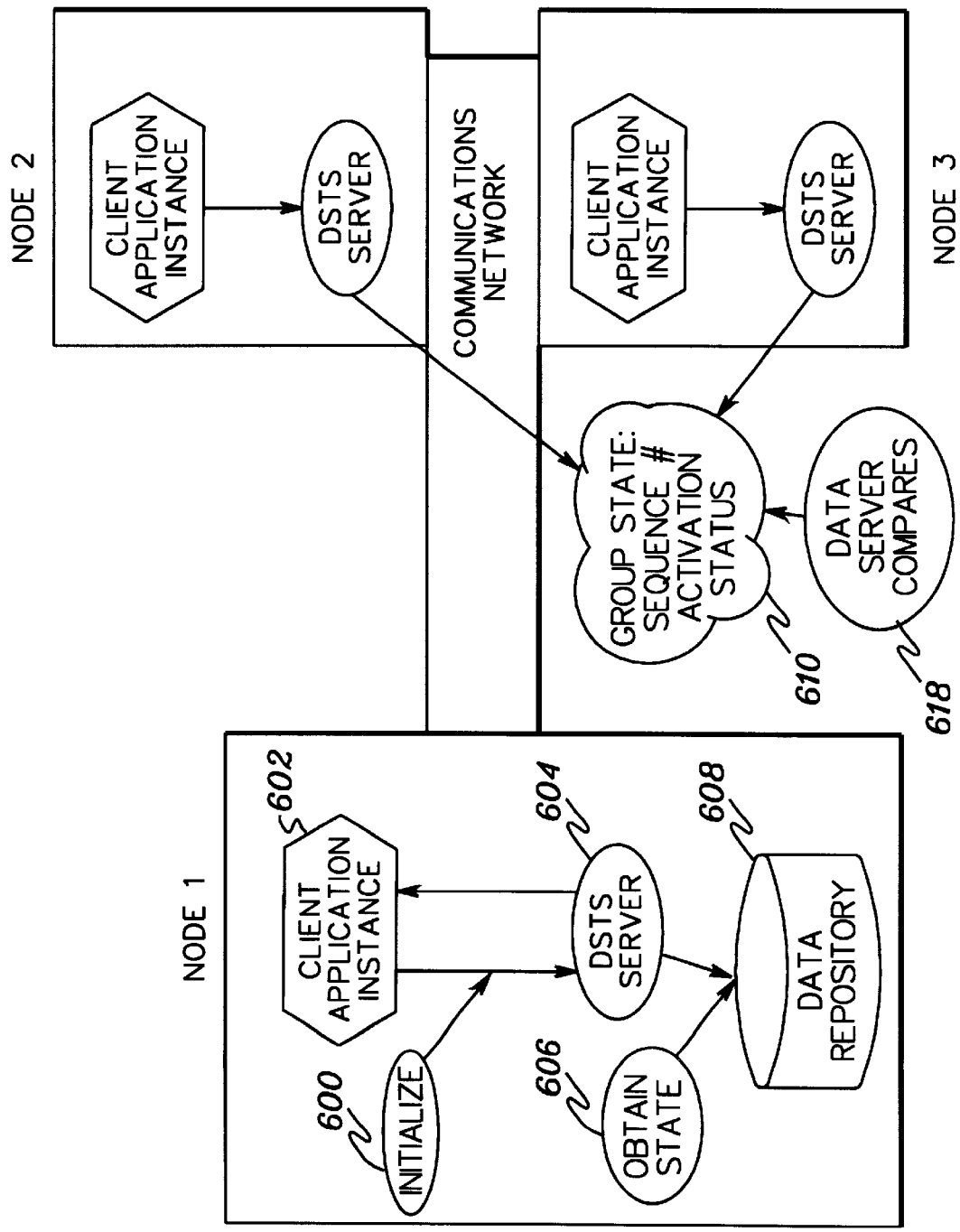
FIG. 6a depicts one example of the components associated with a group activation protocol, in accordance with an aspect of the present invention.
Figure 6B:
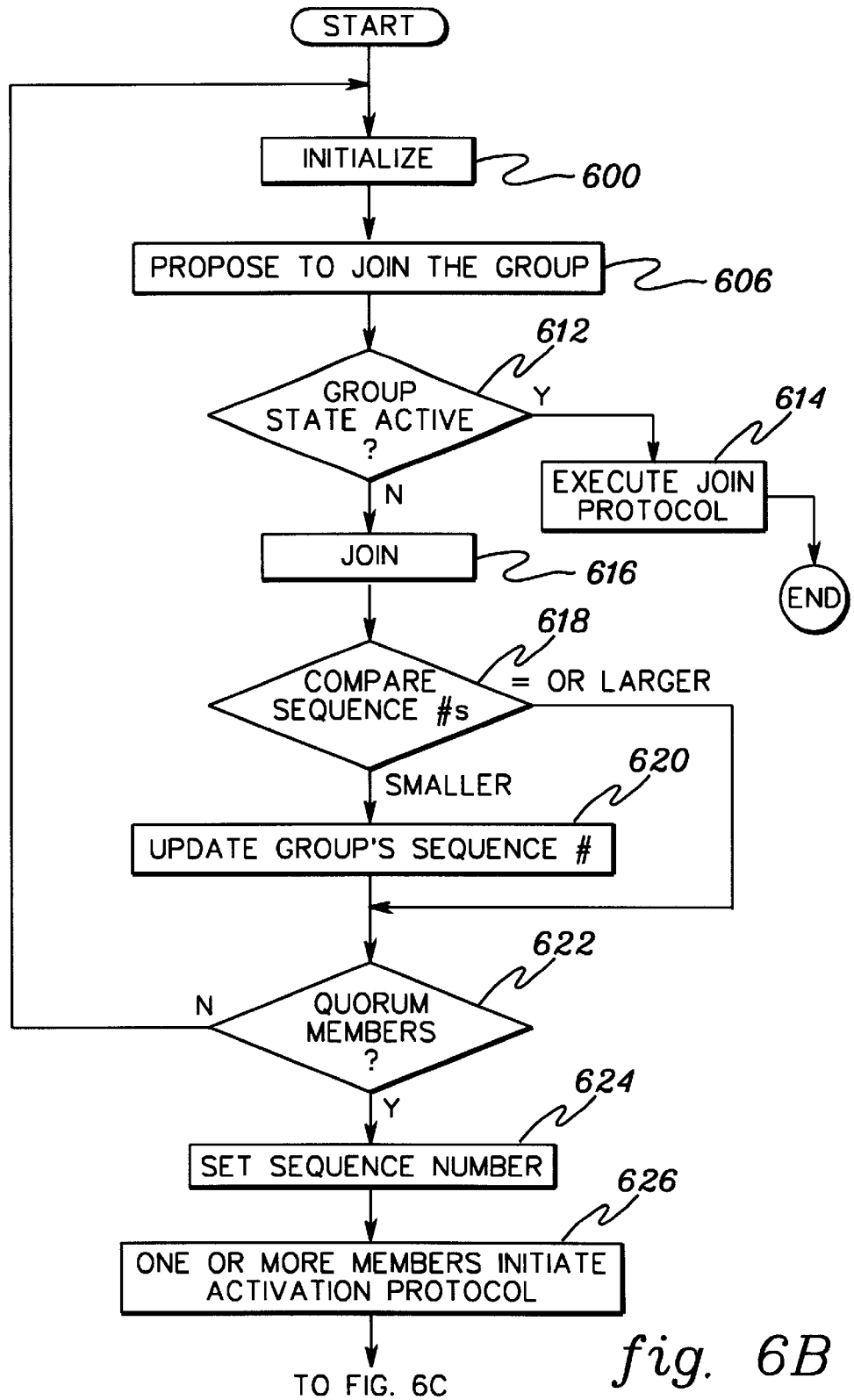
FIGS. 6b–6d depict one embodiment of the logic associated with performing group activation, in accordance with an aspect of the present invention.
Figure 6C:
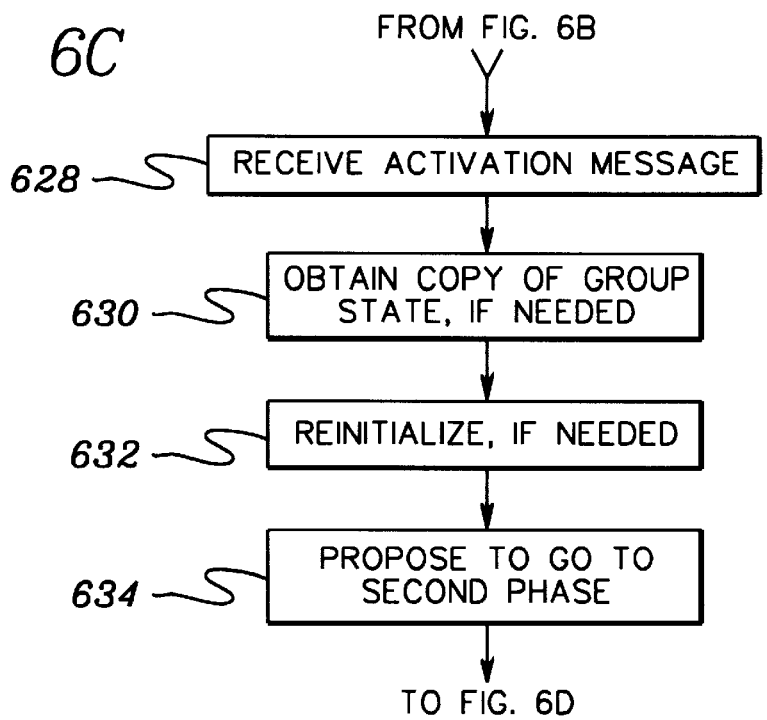
Figure 6D:
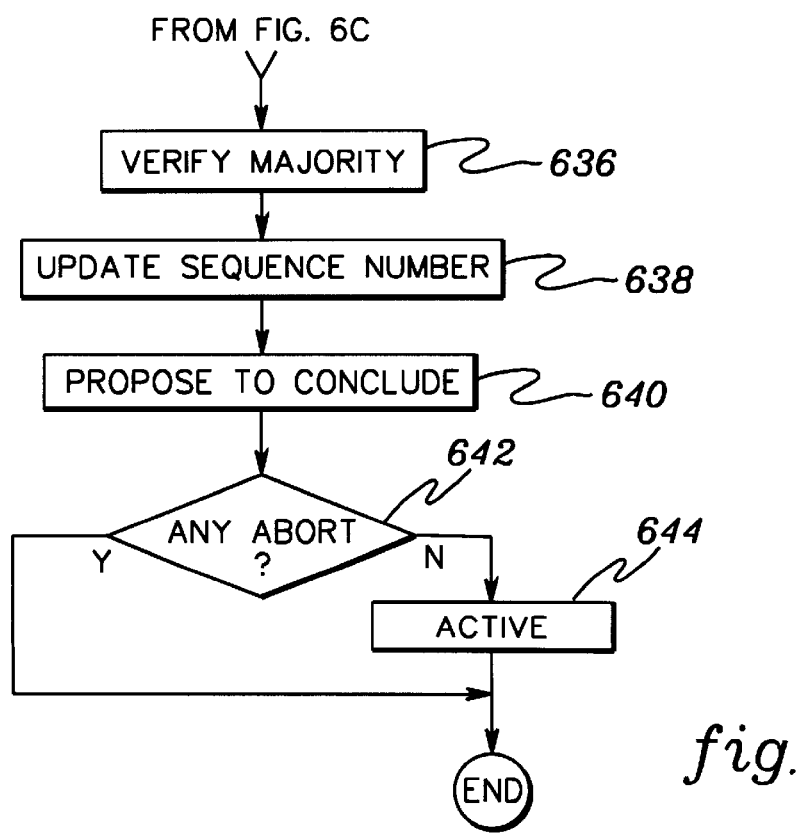

One embodiment of the logic associated with admission to a group is described with reference to FIGS. 6a–6d. In particular, FIG. 6a depicts one example of the components involved in activating a group; and FIGS. 6b–6d depict one embodiment of the logic. In the initial case of group activation, there are no members in the processing group. The group is assumed to have been previously defined, but none of the copies (i.e., DSTS) of the group are currently being executed. A DSTS copy begins to be executed, when it is connected to by a client application.

Figure 7:
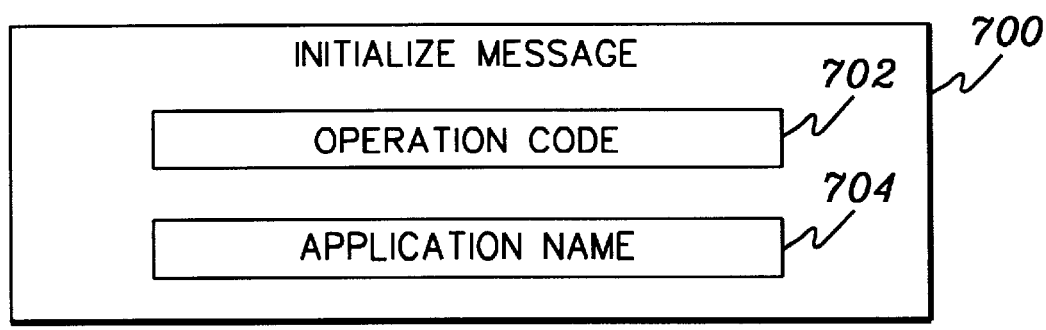
FIG. 7 depicts one example of the fields associated with an initialize message, in accordance with an aspect of the present invention.

In one example, a client application 602 connects to a DSTS server 604 via an initialize message, STEP 600 (FIGS. 6a, 6b). The initialize message is sent from client application instance 602 to DSTS server 604 to connect to the DSTS system. Specifically, in one example, the client application instance connects to the DSTS server on the same node as the client application instance. One example of the initialize message is described with reference to FIG. 7.

An initialize message 700 includes, for instance, an operation code 702 indicating the type of operation (e.g., initialize) being requested, and a name 704 of the client application issuing the request. The DSTS system uses the application name to propagate transactions to the other instances of the application (i.e., the members of the replicated group) having the same name.

Referring back to FIGS. 6a–6b, in response to this message, the DSTS server proposes to join a group (designed by application name 704 (FIG. 7), STEP 606 (FIG. 6b). As it proposes to join the group, the DSTS server reads the group state from persistent storage 608 (FIG. 6a). The group state 610 includes, for instance, the group sequence number and the activation status. If the group state is active, INQUIRY 612 (FIG. 6b), the joining copy executes a join protocol, STEP 614, as described below. Otherwise, the state is inactive, and the copy is able to join the group immediately, without executing the below defined join protocol, STEP 616.

As the DSTS server joins the group, the copy compares the group's sequence number with its own sequence number, STEP 618. If the group's sequence number is smaller than its own, then the copy updates the group's sequence number, STEP 620. Thereafter, or if the group's sequence number is equal to or larger than the copy's sequence number, a determination is made as to whether a quorum (in this example) of members has been reached, INQUIRY 622.

If quorum has not been reached, then processing continues with STEP 600, for another member, at least until quorum is reached. As a quorum of members join the group, the copies which are members of the processing group have knowledge that the quorum was achieved. At this point, the group's sequence number is set to the highest incarnation of the members, STEP 624. The members, whose sequence number match the group's when this point is reached, initiate an activation protocol by sending a group activation message, STEP 626. The group activation message initiates a multi-phase protocol.

In the first phase of activation, the members of the group receive the group activation message, which contains the node address of the member which sent the message, STEP 628 (FIG. 6c). Then, the current group members whose sequence numbers are lower than the current group's sequence number ask the sender of the activation message for a copy of the group state that is associated with the group's sequence number, STEP 630. These members reinitialize themselves using the new group state, STEP 632, and then propose to continue to the second phase of group activation, STEP 634. Any member that fails initialization at this point votes to abort the protocol.

The members whose sequence number match those of the group also propose to go to the second phase. If all current members propose to go to the second phase (none aborts), the second phase begins.

As the first phase of group activation finishes, the current members of the processing group verify that a majority of the members was maintained, STEP 636 (FIG. 6d). Furthermore, each member now has the same consistent sequence number and copy of the distributed state.

The members now change the group sequence number by, for instance, adding 1 to it, STEP 638. The members then store the new sequence number in group state and propose to conclude the protocol, STEP 640. Any member that fails at this stage proposes to abort the protocol.

In protocol completion, if no current member aborted, INQUIRY 642, then the group has the guarantee that the current members of the group have the same consistent group state and sequence number, and that the new sequence number has been stored by a majority of the numbers of the group. The group state is then changed to active, STEP 644.

Figure 8:
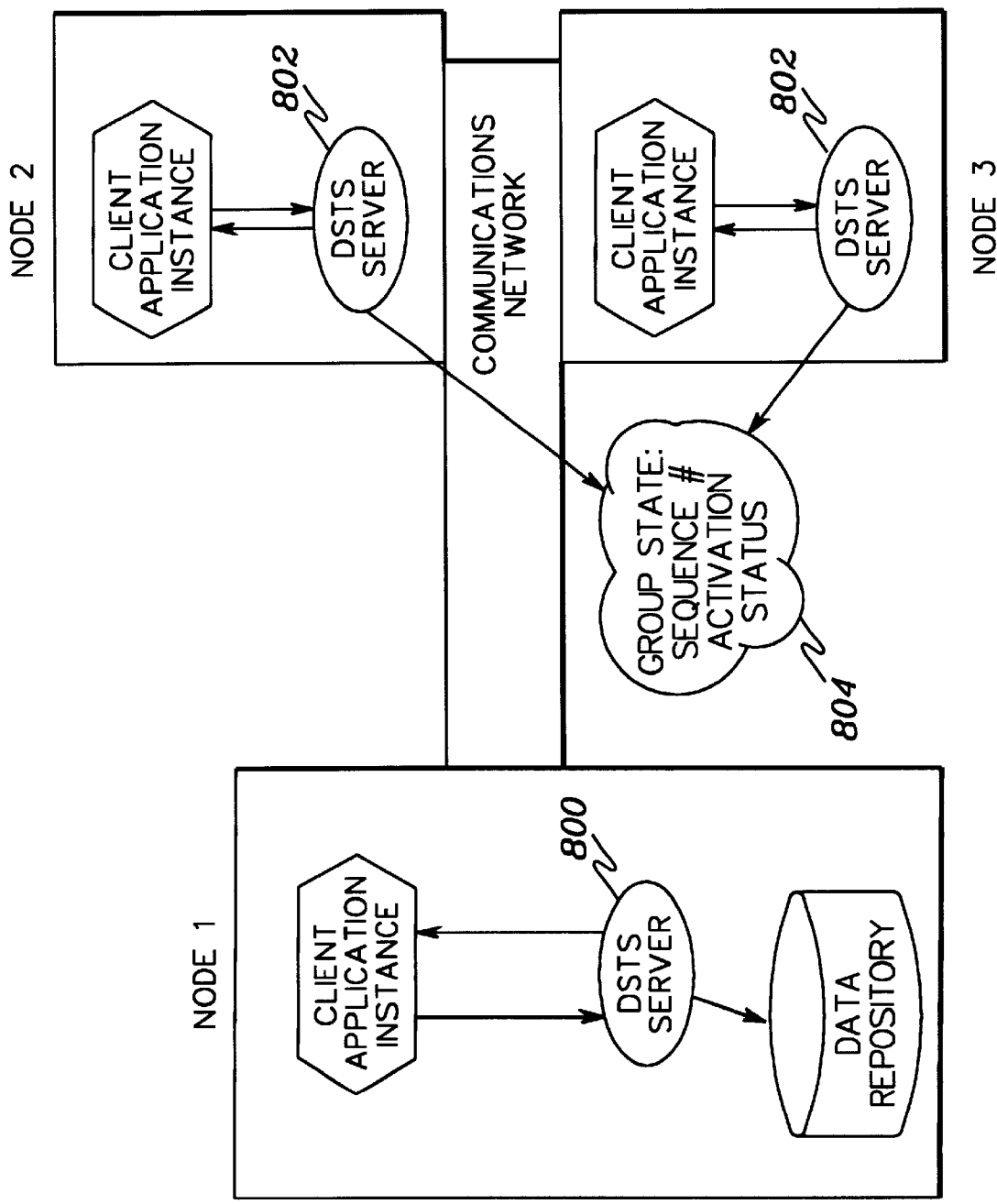
FIG. 8 depicts one embodiment of the components associated with a group join protocol, in accordance with an aspect of the present invention.
Figure 9A:
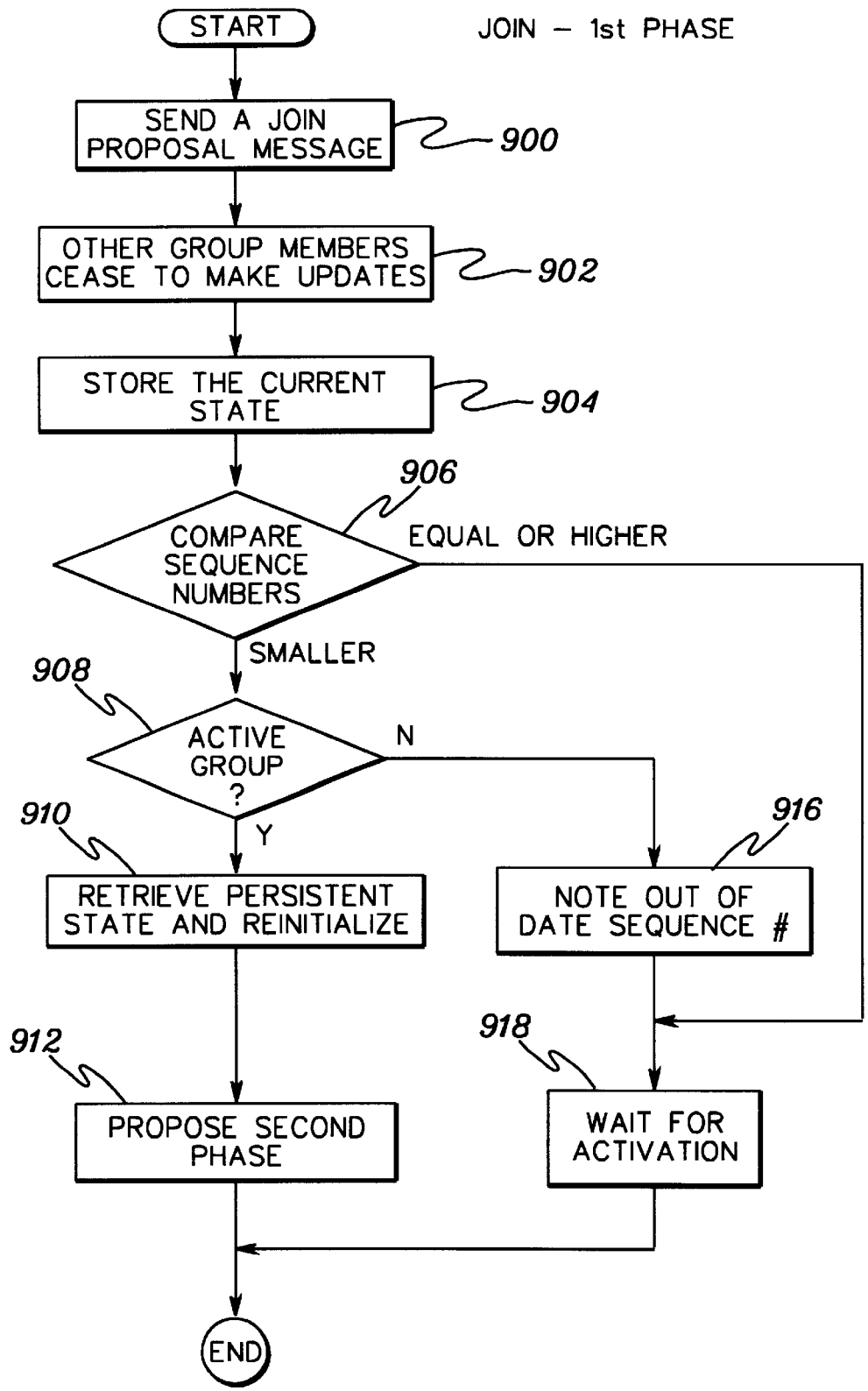
FIGS. 9a–9b depict one embodiment of the logic associated with joining a processing group, in accordance with an aspect of the present invention.
Figure 9B:
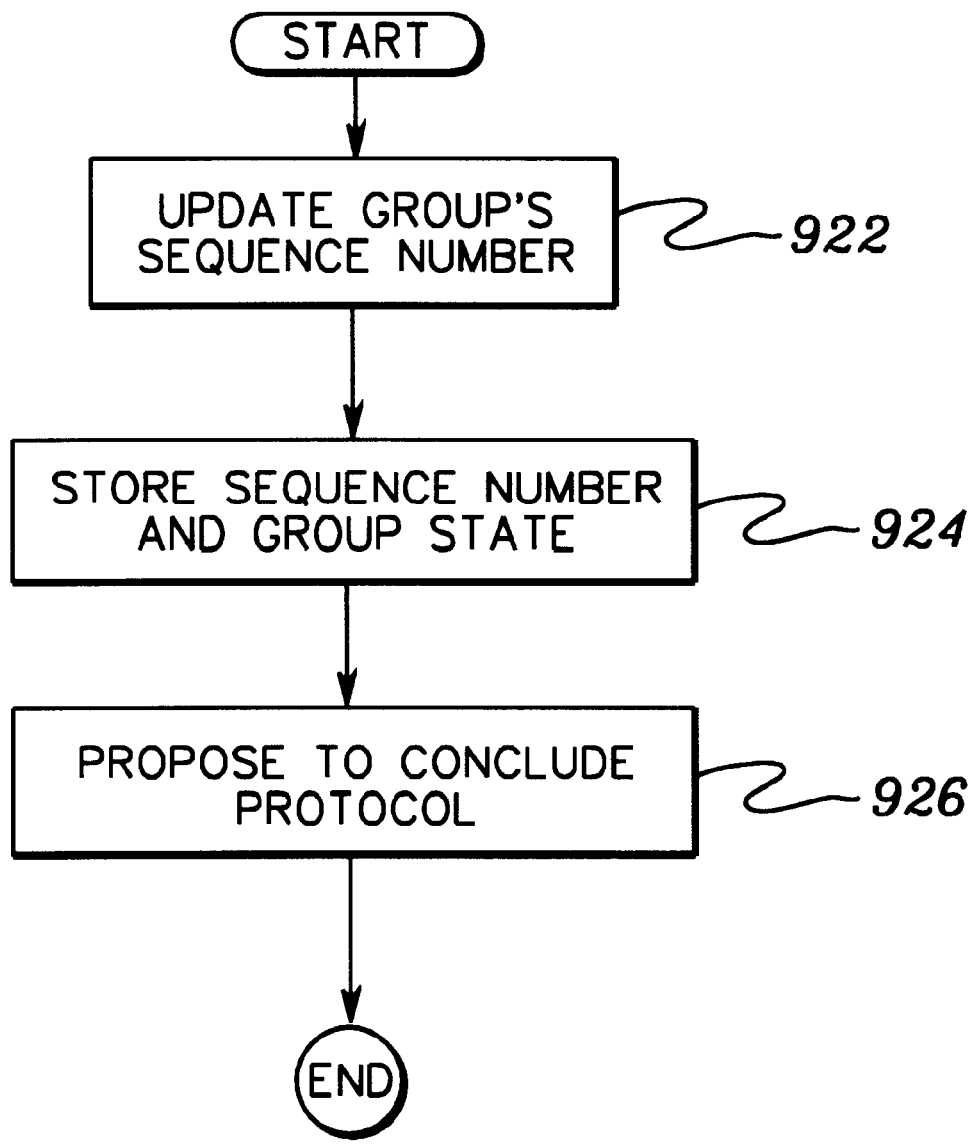

Each time a member joins an active group, it initiates a multi-phase group admission protocol, one embodiment of which is described with reference to FIGS. 8 and 9a–9b. In particular, FIG. 8 depicts the components of the join process, while FIGS. 9a–9b depict one embodiment of the logic. In the first phase of the protocol, the joining member (800 of FIG. 8) sends a join proposal message with the sequence number that it retrieved from persistent storage, or a negative infinity, if it was unable to retrieve the sequence number, STEP 900 (FIG. 9*a*). As examples, the sequence number, as well as other group state, may not be available, when the disk where the state is stored is corrupted or is otherwise not available, or when this is actually the first time that the member copy is being executed under any given processor.

Figure 10:
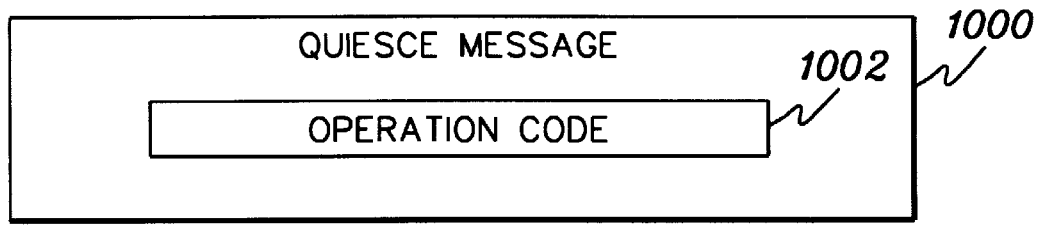
FIG. 10 depicts one example of the fields associated with a quiesce message, in accordance with an aspect of the present invention.

In response to receiving the join proposal message, the other members of the group (802, FIG. 8) cease to make updates to the distributed data, STEP 902. In one embodiment, in order to cease the updates, each member of the group sends a quiesce message to its corresponding client application instance. One example of the quiesce message is described with reference to FIG. 10.

A quiesce message 1000 includes, for instance, an operation code 1002 specifying that this a quiesce operation. The quiesce message requests the client applications to cease sending update requests (e.g., replicate request messages described below), such that the global state of the application is stabilized.

Figure 11:
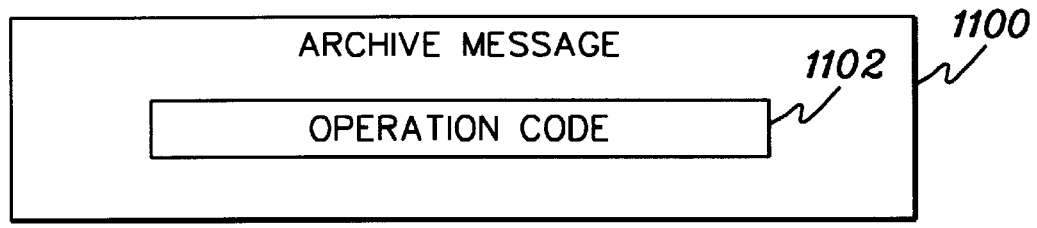
FIG. 11 depicts one embodiment of the fields associated with an archive message, in accordance with an aspect of the present invention.

Thereafter, each copy of the application is requested to produce a snapshot of the current state of the application and to store this state in persistent storage, STEP 904. This request is performed by sending an archive message to the copies of the application. One example of an archive message is described with reference to FIG. 11. In one example, an archive message 1100 includes an operation code 1102 indicating that this is an archive request.

All of the members receive a copy of the join proposal, including the joining member. The joining member then compares the sequence number of the proposal with the present group membership or a negative infinity, if no other members are part of the group, INQUIRY 906. If the joining member's sequence number is smaller than the group's sequence number, then a determination is made as to whether the group is active, INQUIRY 908. In one example, this determination is made by checking the activation status in the group state (804, FIG. 8).

If the group is still active, then the joining member contacts one of the members which has the larger sequence member, and retrieves the persistent state of the distributed system from that member's node, and moves it to the application storage area, STEP 910. In particular, in one example, the DSTS system uses a dearchive message to retrieve the snapshot from storage and request the outdated copy of the application to load the most updated snapshot.

Figure 12:
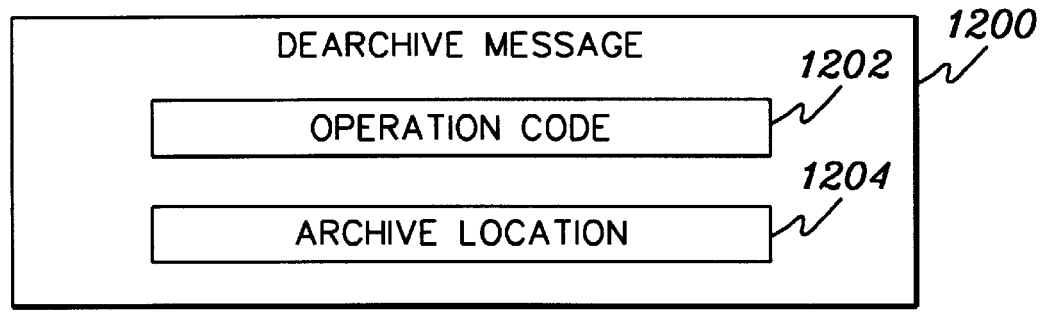
FIG. 12 depicts one embodiment of the fields associated with a dearchive message, in accordance with an aspect of the present invention.

One example of the dearchive message is described with reference to FIG. 12. A dearchive message 1200 includes an operation code 1202 indicating that this is a dearchive message, and an archive location field 1204 indicating from where the data is to be retrieved.

Figure 13:
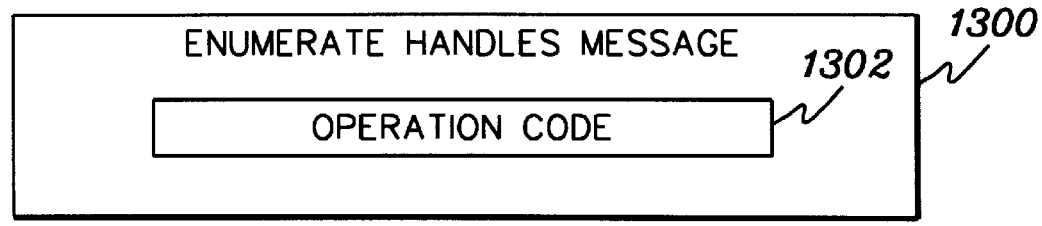
FIG. 13 includes one example of the fields associated with an enumerate handles message, in accordance with an aspect of the present invention.

In addition to issuing the dearchive message, the DSTS server also issues an enumerate handles message, which is executed, for instance, substantially immediately after the client application loads a snapshot of the persistent state. An enumerate handles message 1300 (FIG. 13) includes, for example, an operation code 1302 indicating that this is an enumerate handles message. After receiving this message, the client application returns a handle enumeration message to the DSTS system, which maps the names of the resources that the application has created to resource handles.

Figure 14:
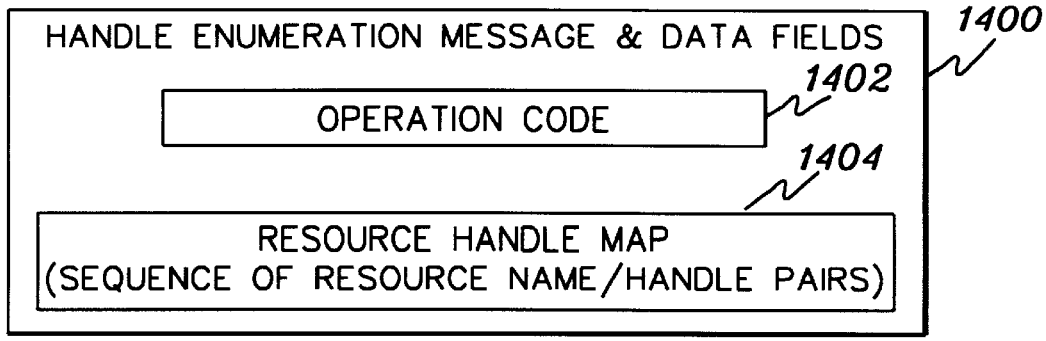
FIG. 14 depicts one example of the fields associated with a handle enumeration message, in accordance with an aspect of the present invention.

One example of the handle enumeration message is described with reference to FIG. 14 and includes, for example, an operation code 1402 indicating that this is the handle enumeration message, and a resource handle map 1404, which includes one or more pairs of resource names and handles. These handles are unique names used, for instance, to notify third party applications of changes to the client application's state, and to serialize simultaneous update requests to the same resources, as described below.

After successfully reinitializing itself by loading the snapshot, the new copy is allowed to participate in the DSTS system, and a resume message is sent to all copies such that the DSTS system may resume normal operation. Further, the new copy proposes to begin the second phase of join, STEP 912.

Returning to INQUIRY 908, if the group becomes inactive, the joining member notes the fact that its sequence number is outdated, STEP 916, and waits for an activation message to take further action, STEP 918. The joining member does not take place in the second phase of join.

Returning to INQUIRY 906, if the joining member's sequence number is equal to the sequence number of the group, then the group is inactive. This fact is given by a virtue of the group activation protocol (e.g., a quorum policy, in this example) and by the property of quorum enforcement. Thus, the joining member waits for an activation message to take effect, STEP 918, and there is no second phase of join. Similarly, if the joining member's sequence number is higher, INQUIRY 906, it also follows that the group is inactive, and thus, the joining member waits for an activation message, STEP 918.

If the joining member has proposed to proceed to the second phase, it has the new sequence number and distributed state. Thus, the members (including the joining member) now change the group's sequence number by, for instance, adding one to it, STEP 922 (FIG. 9*b*). The members then store the new sequence number and group state, STEP 924, and further, they propose to conclude the protocol, STEP 926. Any member that fails at this stage, proposes to abort the protocol. If no member aborts, the group is guaranteed that the current members of the group have the same consistent group state and sequence number, and that the new sequence number has been stored for a majority of the members of the group.

Figure 15:
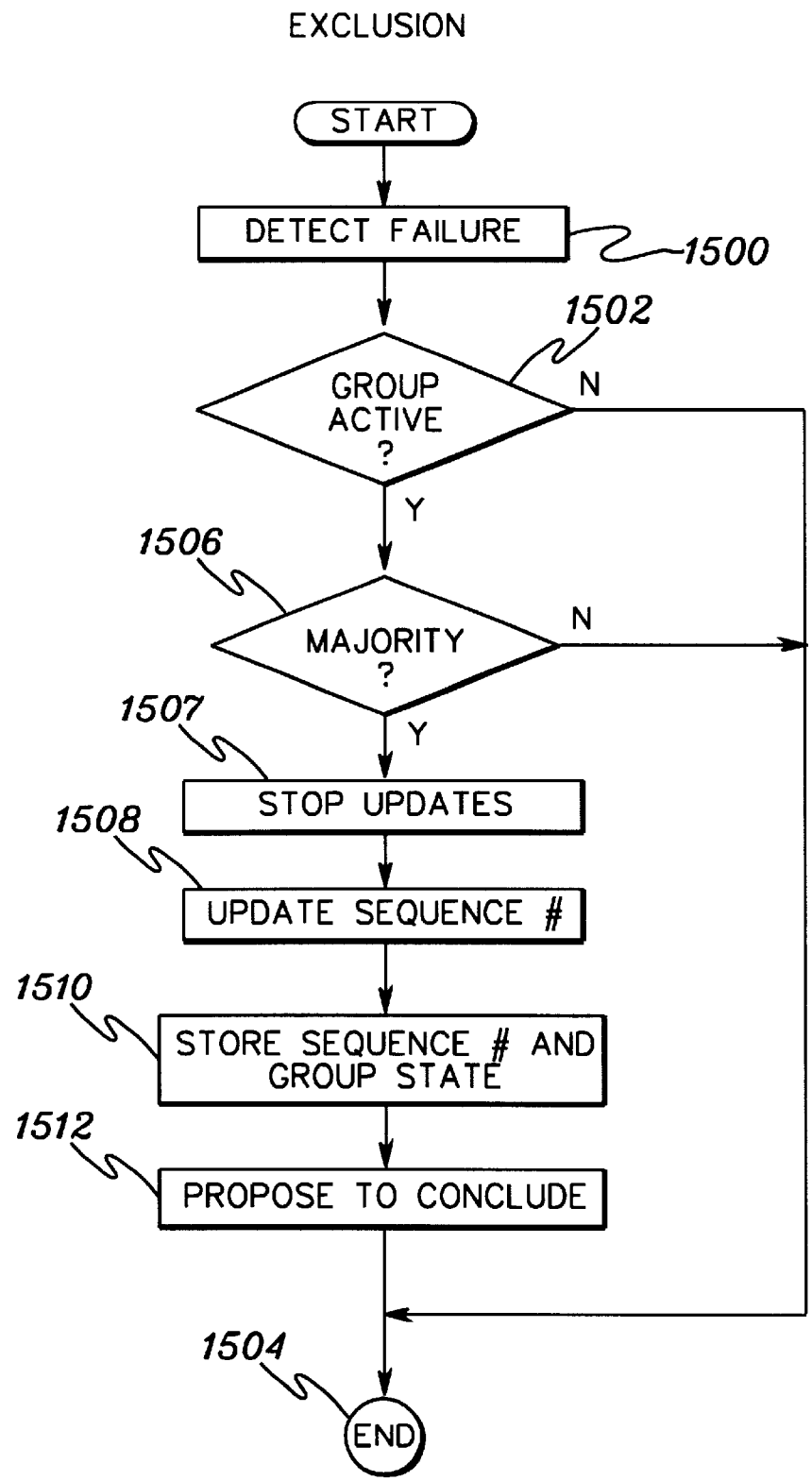
FIG. 15 depicts one embodiment of the logic associated with excluding a member from a processing group, in accordance with an aspect of the present invention.

In addition to the above, a member can be excluded from a group. In particular, each time a node fails, or the DSTS copy that executes on the node fails, the remaining members of the group notice that a member has failed, STEP 1500 (FIG. 15). If the group is inactive, INQUIRY 1502, no action is taken, STEP 1504. Further, if the group is active, but does not have a majority of members, INQUIRY 1506, then no action is taken.

However, if the group is active and retains majority, INQUIRY 1506, then each member stops any further updates to the distributed state, STEP 1507. Additionally, each member changes the group sequence number by, for instance, adding 1 to it, STEP 1508, and stores the new sequence number and the group state, STEP 1510. Then, the members propose to conclude the protocol, STEP 1512. Any member that fails at this stage proposes to abort the protocol.

If no member aborts, then the group has a guarantee that the current members of the group have the same consistent group state and sequence number, and that the new sequence number has been stored by a majority of the members of the group.

Figure 16:
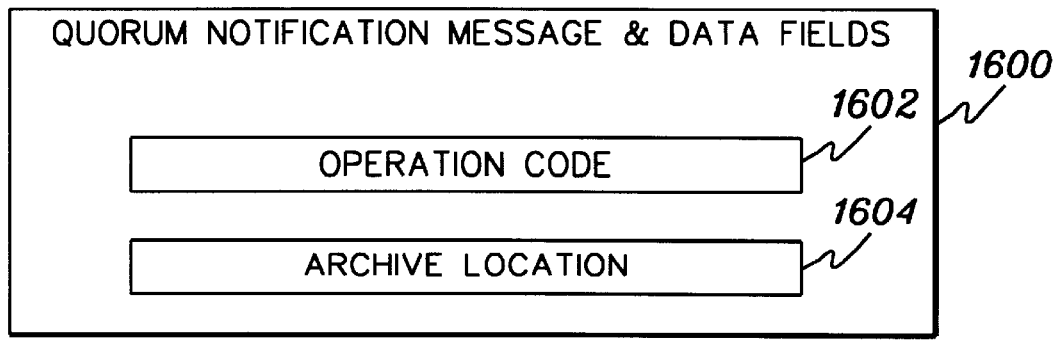
FIG. 16 depicts one example of the fields associated with a quorum notification message, in accordance with an aspect of the present invention.

The DSTS system notifies the client application instances when a quorum (majority) of DSTS servers is available or has been lost, by utilizing, for instance, a quorum notification message. In one example, a quorum notification message 1600 (FIG. 16) includes an operation code 1602, and the quorum information 1604, indicating whether the group has quorum.

As described herein, members of a processing group are utilized to replicate distributed synchronous transactions, which are initiated by client application instances coupled to the members of the group. To facilitate communication between the client instances and the server members of the group, various messages are employed. In one example, these messages include (in addition to the messages described above) a replicate request message, a replication callback message, a replication callback result message, a replication completed message and a shutdown message, each of which is described below.

Figure 17:
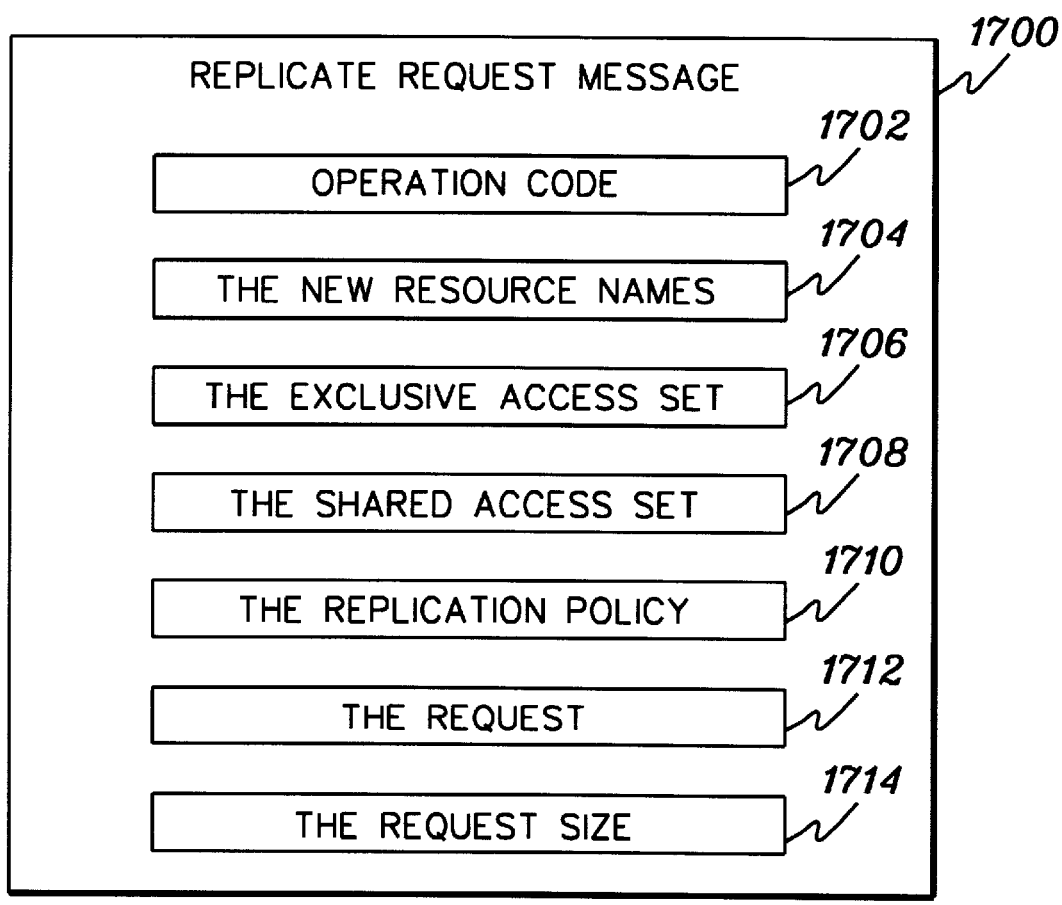
FIG. 17 depicts one example of the fields associated with a replicate request message, in accordance with an aspect of the present invention.

One example of a replicate request message is described with reference to FIG. 17. A replicate request message 1700 is a message that initiates the distributed transaction. In one example, it includes an operation code 1702 indicating that this is a replicate request message; a list of the new resource names 1704 being created, if any; an exclusive access set 1706 specifying zero or more exclusive resources of the client application; a shared access set 1708 specifying zero or more shared resources of the client application; a replication policy 1710 providing rules to be adhered to during the replication (e.g., a quorum of the group needed to proceed with certain tasks); a request 1712 specifying the transaction to be replicated and performed (e.g., a create or update request); and a request size 1714 indicating the size of the request.

The replicate request message is sent by a single client application instance (a.k.a., the initiator) to a server process of the DSTS system. Upon receipt of the message (or sometime thereafter), the server process distributes the message to one or more other server processes of the distributed computing environment. In particular, in one example, it is sent to all of the other current server processes of the processing group.

Figure 18:
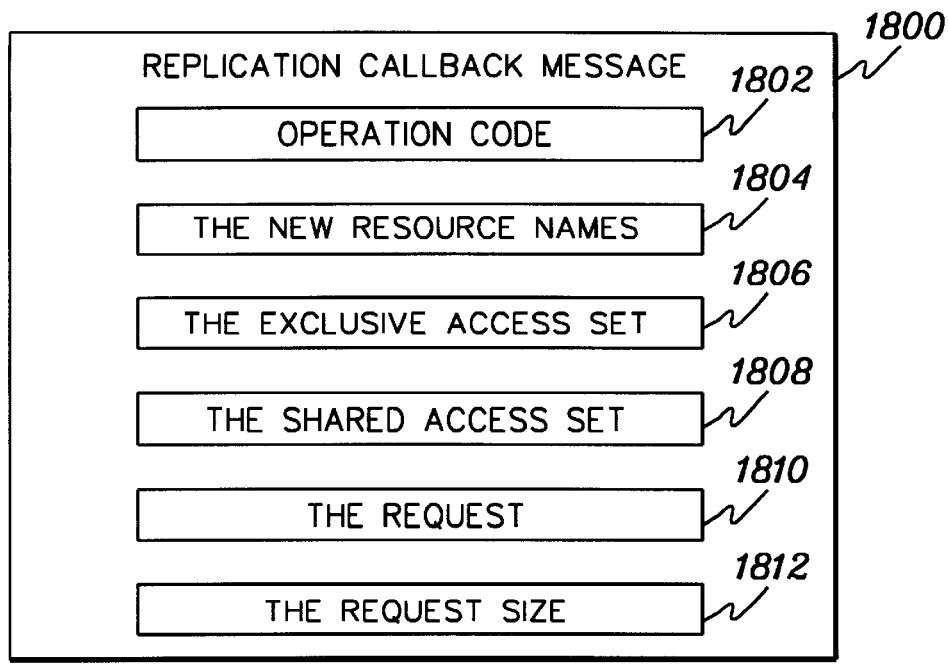
FIG. 18 depicts one example of the fields associated with a replication callback message, in accordance with an aspect of the present invention.

In response, each of the server processes sends a replication callback message to the corresponding instances (peers) of the client application. One example of a replication callback message is described with reference to FIG. 18. A replication callback message 1800 includes, for instance, an operation code 1802 indicating that this is a replication callback message; an array of the new resource names 1804, if any are to be created; an exclusive access set 1806 specifying zero or more exclusive resources of the client application; a shared access set 1808 specifying zero or more shared resources of the client application; a request 1810 specifying the transaction to be replicated and performed; and a request size 1812 indicating the size of the request.

Figure 19:
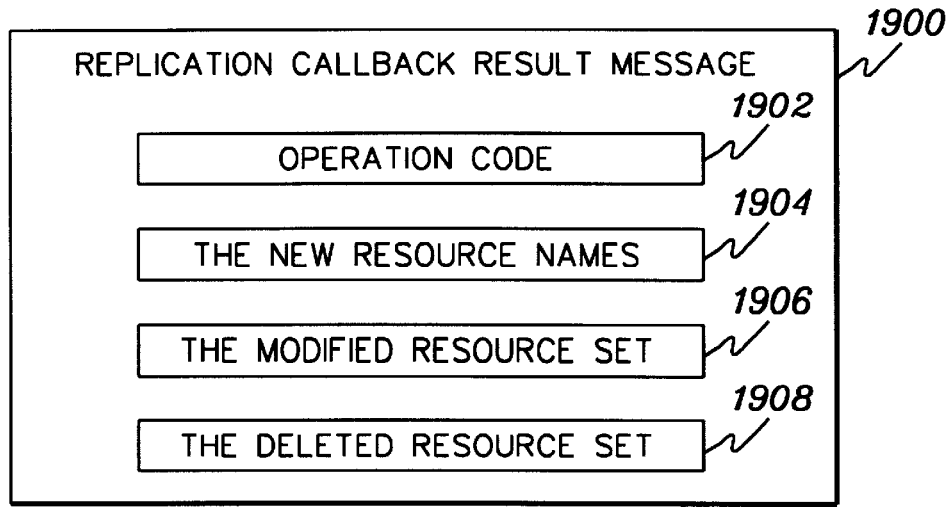
FIG. 19 depicts one example of the fields associated with a replication callback result message, in accordance with an aspect of the present invention.

In addition to the above, a replication callback result message is sent from the client application to the DSTS server, after the requested transaction is processed. One example of a replication callback result messages is described with reference to FIG. 19. A replication callback result message 1900 includes an operation code 1902 indicating that this is a replication callback result message; an array of the new resource names 1904, if any, along with their handles (e.g., unique identifiers); a modified resource set 1906, including the handles of any modified resources; and a deleted resource set 1908, including the handles of any deleted resources.

Figure 20:
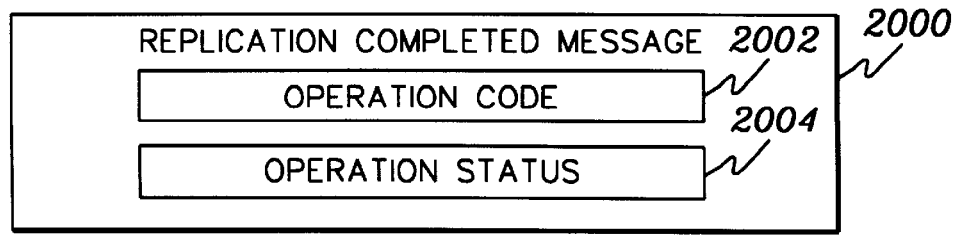
FIG. 20 depicts one example of the fields associated with a replication completed message, in accordance with an aspect of the present invention.

After the server processes receive the replication callback results, they verify that the transaction has been completed by forwarding a replication completed message 2000 (FIG. 20). In one example, replication completed message 2000 includes an operation code 2002 indicating that this is a replication completed message; and an operation status 2004 specifying whether the transaction was performed successfully.

Figure 21:
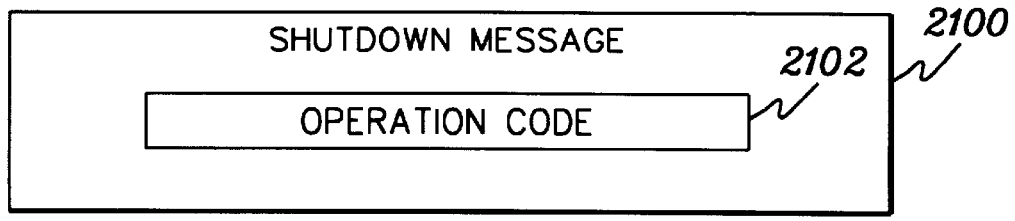
FIG. 21 depicts one example of the fields associated with a shutdown message, in accordance with an aspect of the present invention.

Should the system be shut down, the DSTS system utilizes a shutdown message that notifies the copies of the client application that the system is about to shut down. In one example, a shutdown message 2100 (FIG. 21) includes an operation code 2102 indicating that shutdown is to be performed. This message has the objective of allowing the copies of the client application to perform a graceful shutdown procedure, terminating any pending transaction(s). When the client applications terminate the shutdown process, they reply with a shutdown acknowledgment to the DSTS system.

Figure 22A:
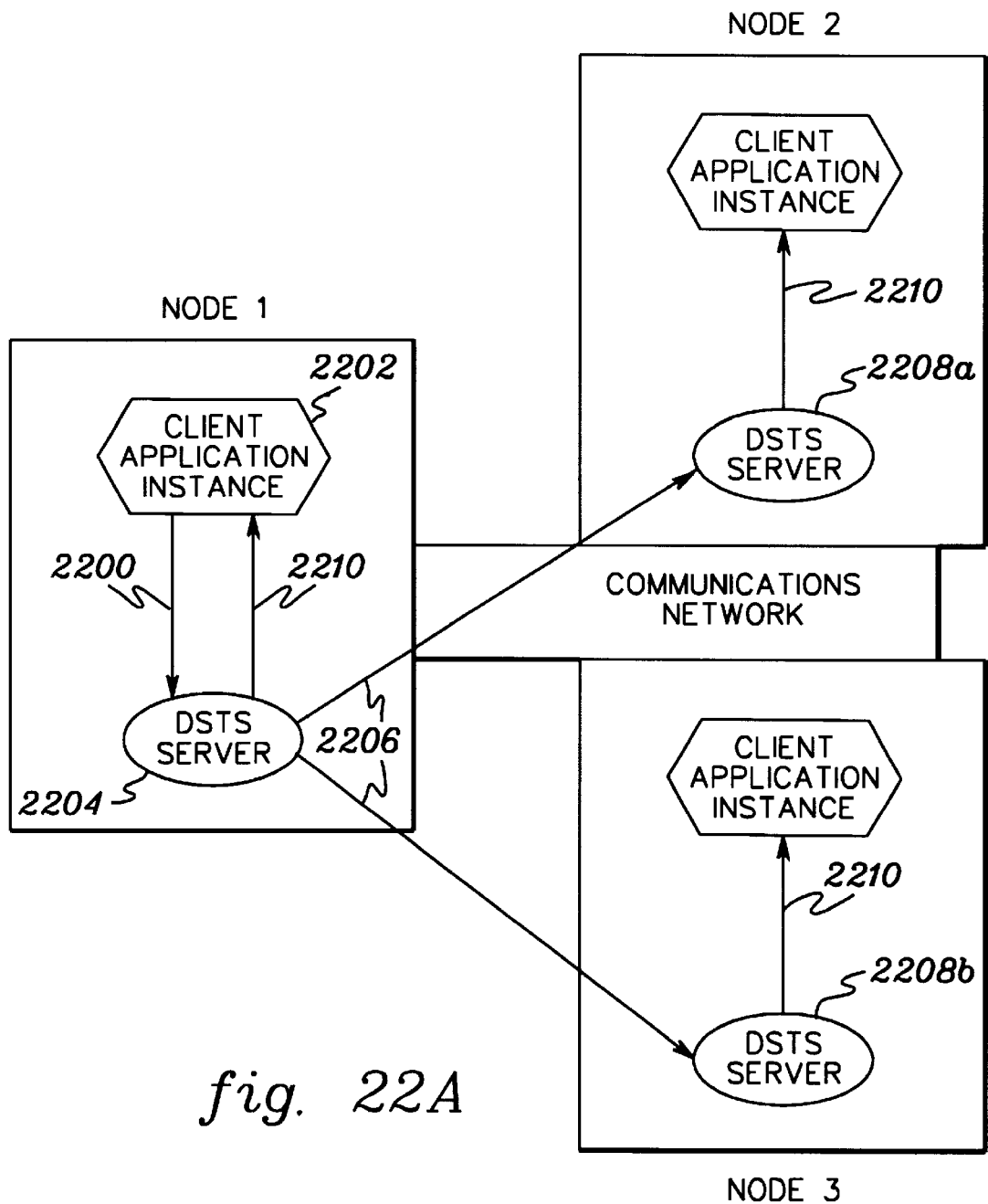
FIGS. 22a–22b depict one embodiment of the flow of messages associated with processing a synchronous transaction, in accordance with an aspect of the present invention.
Figure 22B:
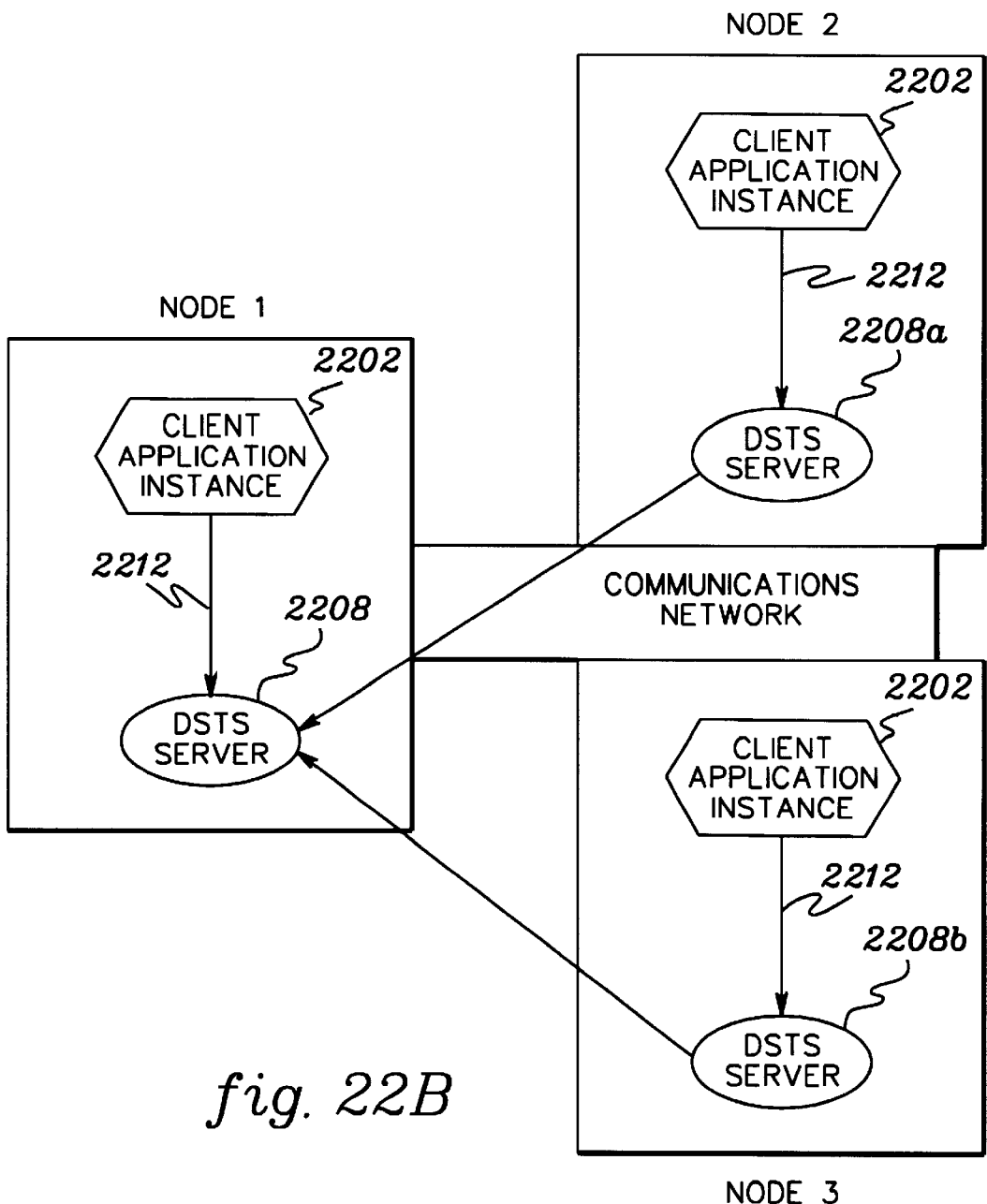

Utilization of the above-described replication messages is further described below with reference to FIGS. 22a and 22b. Referring to FIG. 22a, a replicate request message 2200 is sent by a single client application instance 2202 to a server process 2204 of the DSTS system. The server then distributes 2206 the replicate request message to the other servers 2208a, 2208b of the processing group. Each of the servers, in this example, then sends a replication callback message 2210 to its corresponding instance of the client application. For example, server 2204 sends a replication callback message 2210 to the client application instance located in Node 1. Similarly, server 2208a sends a replication callback message to the client application instance in Node 2, and so forth.

Thereafter, each copy of client application 2202 (FIG. 22b) processes the requested transaction, commits the callback, and sends a replication callback result message 2212 to its corresponding server. A copy of the callback result message is then forwarded from the servers of the non-initiator clients (e.g., 2208a, 2208b) to the server of the request initiator (e.g., 2208).

Subsequently, the DSTS server of the request initiator (e.g., server 2208) verifies that the transaction has been completed by a majority of the copies of the application. A majority is defined as the integer division of the number of servers by two, discarding the decimal part and adding one to the result. For example the majority of three client instances is 3/2+1, which is 2. If the majority of the client applications is successful in performing the transaction, then the transaction is committed, and a replication completed message is forwarded from server 2208 to its corresponding application instance. Otherwise, the transaction is aborted. The completion of the transaction by a majority of the copies of the application ensures the persistence of the operation. Any copy of the application which is unable to perform a transaction is expelled from the DSTS group, as described above.

In accordance with an aspect of the present invention, the replicated distributed transactions are committed using a two-phase commit protocol. Further, when a transaction is committed by one copy of the server, it is also committed by the other copies of the processing group.

Each synchronous replicated transaction is associated with a set of tokens (handles), for which either exclusive or shared access is requested during processing of the transaction. Although, the transactions do not require that any locks related to the access tokens be obtained prior to initiation, transactions which access the same exclusive access tokens are serialized. That is, the members of a processing group commit one transaction (the same transaction), before another transaction is allowed to be committed.

In accordance with an aspect of the present invention, a serialization technique is provided that allows for transactions using the same resources to be initiated in parallel. The initiator of a transaction lists which tokens (e.g., handles) the transaction requires for exclusive and shared use. As an alternative, a central token granting facility (server) can be used. The initiator would obtain tokens from the central token granting facility before initiating the transaction. However, for a majority of the cases, the tokens do not conflict, so there is a great improvement in performance over a token granting server approach. But in the case in which tokens do conflict, the serialization technique of the present invention is performed in order to preserve the consistency of the data in each member of the processing server group.

For example, assume that two transactions are simultaneously initiated, that request exclusive access to a token labeled "A". Further, assume that Server 1 initiates transaction T1, and Server 2 initiates transaction T2. Assume that T1 is supposed to set A=1 and T2 is to set A=2. Assume further there are three members in the processing group, which are to perform these transactions. Since the transactions are initiated simultaneously, their order is not important, but they are to be executed in the same order by all the members.

The synchronously replicated transactions are executed using a two-phase commit protocol. Thus, the data is transmitted in a first phase, called the Prepare to Commit (PTC) phase, and the transaction is committed in a second phase, called the Commit (CMT) phase. The two-phase commit can proceed in parallel (i.e., transactions T1 and T2 can be initiated in parallel), allowing the replication of transactions to be more efficient. However, at some point in the two-phase commit protocol, the transactions are to be serialized. If not, problems arise, as described below.

If the two-phase commit is allowed to proceed in parallel without serialization, it could lead to inconsistent results, as illustrated below:

| Server 1 | Server 2 | Server 3 |
|----------|----------|----------|
| PTC(T1)  | PTC(T2)  | PTC(T2)  |
| PTC(T2)  | PTC(T1)  | PTC(T1)  |

//**the servers wait for acknowledgment that the PTCs were received before processing the Commit phase:

| CMT(T1) | CMT(T1) | CMT(T2) |
|---------|---------|---------|
| CMT(T2) | CMT(T2) | CMT(T1) |

The problem here is that Server 1 and Server 2 executed T1, T2, setting A=1, in these servers. However, Server 3 executed T2, T1, setting A=2, as a final result. The value of "A" is now inconsistent in the processing group, and that is not acceptable in a synchronously replicated transaction system.

In order to overcome this problem, the first phase of the two-phase commit process (the PTC phase) is allowed to proceed in parallel, and then the Commit phase is serialized based on the token information sent in the PTC, in accordance with an aspect of the present invention. The PTC protocol is extended such that it provides information on which tokens are necessary for exclusive/shared access for each transaction. Since an assignment (A=1) requires exclusive access, the token "A" is listed for exclusive access in the PTC of both T1 and T2.

Further details relating to the two-phase commit protocol is described with reference to FIGS. 23 and 24. In particular, one example of the first phase of the two-phase commit protocol, the Prepare to Commit phase, is described with reference to FIG. 23, and one example of the second phase, the Commit phase, is described with reference to FIG. 24.

Figure 23:
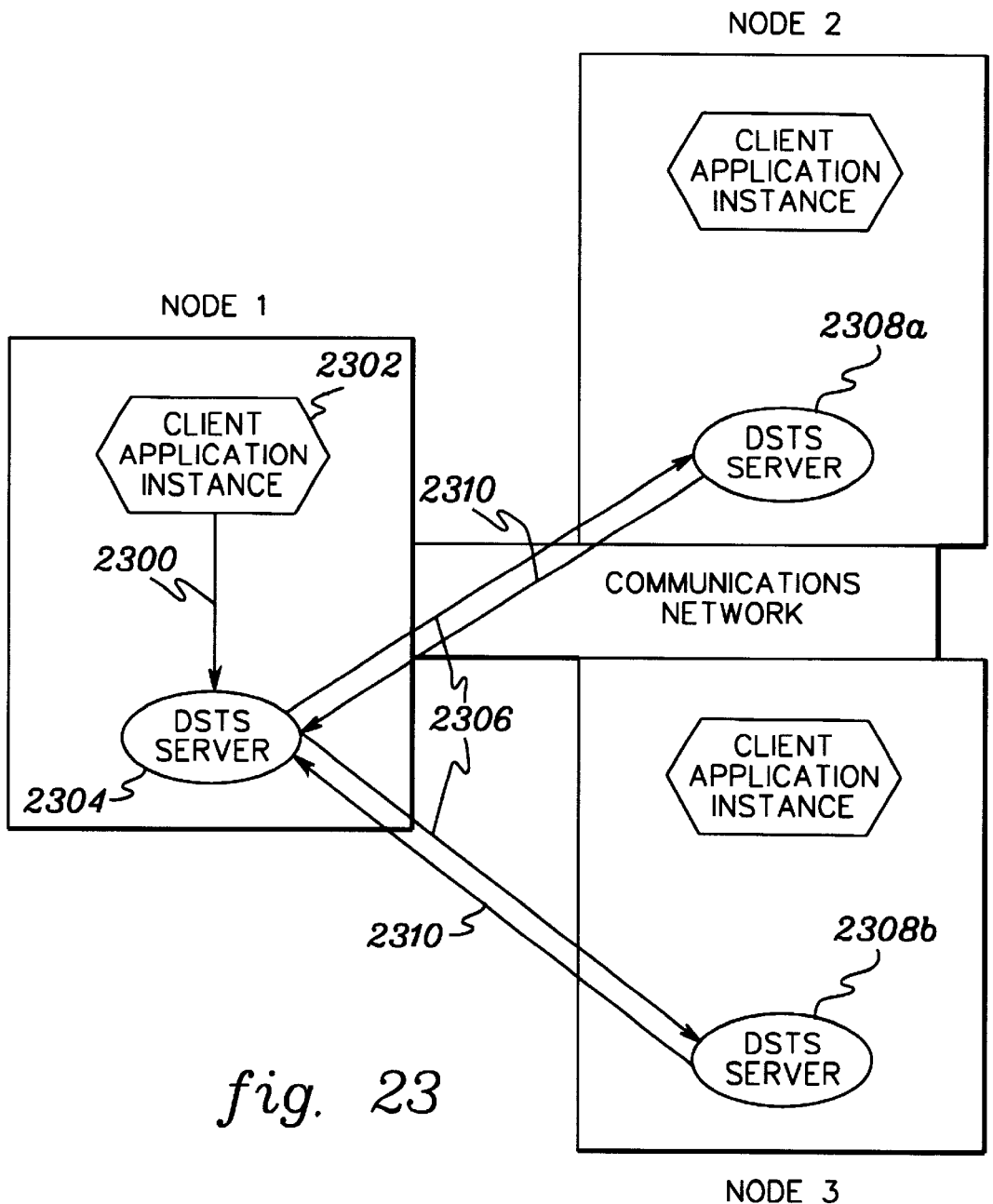
FIG. 23 depicts one embodiment of the flow of messages associated with a Prepare to Commit operation, in accordance with an aspect of the present invention.
Figure 24:
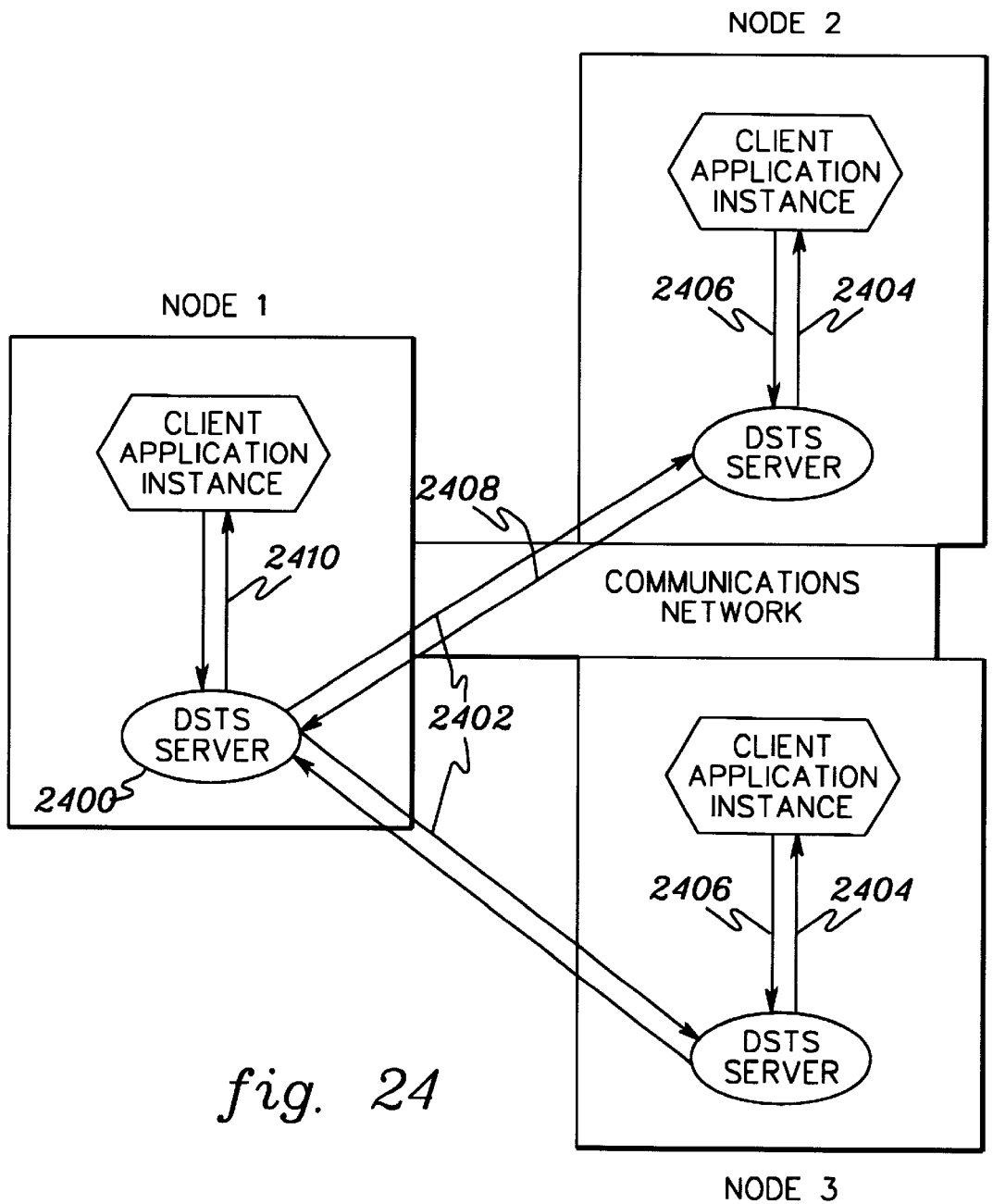
FIG. 24 depicts one embodiment of the message flow associated with a Commit operation, in accordance with an aspect of the present invention.

Referring to FIG. 23, initially, a replicate request message 2300 is sent from client application instance 2302 to server 2304 indicating that a PTC is to be performed. In response to receiving the PTC request, server 2304 sends a PTC message 2306 to the other servers of the group (e.g., server 2308a and 2308b). In one example, the PTC message includes the same fields as the replicate request message, as well as an identifier of the request. Since server 2304 is initiating the PTC, it is referred to as the protocol initiator.

Thereafter, each non-initiator server responds to the PTC request with a PTC acknowledgment (PTC_ACK) message 2310. In particular, server 2308a sends an acknowledgment, which includes an operation code, as well as the request identifier. Similarly, server 2308b sends an acknowledgment, but only after serializing any conflicts. That is, in this example, server 2308b is chosen as a coordinator of the group. Thus, it monitors all of the PTC requests it receives and sends a PTC_ACK message 2310 serializing any conflicting requests. If it notices that two or more PTCs are issued for the same exclusive access resource (or for an exclusive request which conflicts with a shared one), then the group coordinator chooses to commit one of them first, waits for the confirmation that the update is complete, and then commits the second one, and so forth.

The protocol initiator (e.g., server 2304) receives the PTC_ACK messages from the other servers. After it receives all of the PTC_ACK messages for a given message, it sends a commit message, thus, initiating the second phase of the two-phase commit protocol.

One example of the second phase of the two-phase commit protocol is described with reference to FIG. 24. Initially, the protocol initiator 2400 receives PTC_ACK messages from all of the members of the group, and then sends a commit message 2402 to each of the other servers of the processing group. Each server of the group sends a replication callback message 2404 to its corresponding application to request the application to commit the operation. After committing the operation, a replication callback result message 2406 is sent from the client application to the DSTS server.

Thereafter, a commit acknowledge message 2408 is sent from each DSTS server to the protocol initiator (e.g., server 2400). The protocol initiator receives the commit acknowledge messages from all the members of the group and sends a replication completed message 2410 to the initiating client, if at least a majority of the members have completed the request.

In accordance with an aspect of the present invention, this implicit serialization is made possible without any extra messages, including explicit lock messages of the, resources. Instead, a member of the processing group initiates a transaction with the PTC message. It then waits for the acknowledgment that the other members received the PTC message, and this acknowledgment is called the PTC_ACK message. When the initiating member receives all of the PTC_ACKs, it can then issue the commit message. Therefore, concurrent transactions are serialized by making the group coordinator hold its acknowledgment, if it detects conflicts in the PTC phase.

Thus, the conflict problem depicted in the previous example is solved as follows (assuming Server 3 is the coordinator):

| Server 1 | Server 2 | Server 3 | |
|---|---|---|---|
| PTC(T1{A}) | PTC(T1{A}) | PTC(T2{A}) | |
| PTC(T2{A}) | PTC(T2{A}) | PTC(T1{A}) | *coordinator detects simultaneous use of token "A" |

//**The servers wait for the acknowledgment that the PTCs were received

| Server 1 | Server 2 | Server 3 | |
|---|---|---|---|
| | | PTC_ACK(T2{A}) *coordinator acknowledges only receiving T2 although it has already received T1) | |
| CMT (T2) | CMT (T2) | CMT (T2) *all members commit T2 | |
| | | PTC_ACK(T1{A}) *Coordinator now acknowledges receiving T1 | |
| CMT (T1) | CMT (T1) | CMT (T1) *all members commit T1 | |

During the two-phase commit process (and other processing) of a distributed transaction, a failure may occur. If such a failure occurs, procedures are in place for recovery therefrom, in accordance with an aspect of the present invention. In one example, a transparent recovery of the DSTS system is performed, and no pending transactions are lost during the recovery process. As one example, the pending transactions are completed without requiring the reposting of the transactions, even if a number of members of the DSTS group fail.

In accordance with an aspect of the present invention, a facility is provided that makes possible the completion of a pending transaction in the event that any member of the DSTS group experiences a failure. Since the DSTS system can recover from the failure of one or more of the member copies of the system, the system is said to be highly available. The solution to this problem is complicated by the fact that, even though the DSTS system guarantees that transactions complete synchronously, the arrival of the messages in a two-phase protocol is not synchronous. That is, not all the members receive the PTC and CMT messages at the same time, and as a consequence at any point in time, each member may have received a different set of messages related to a protocol, and the messages may have been received in different order.

Figure 25:
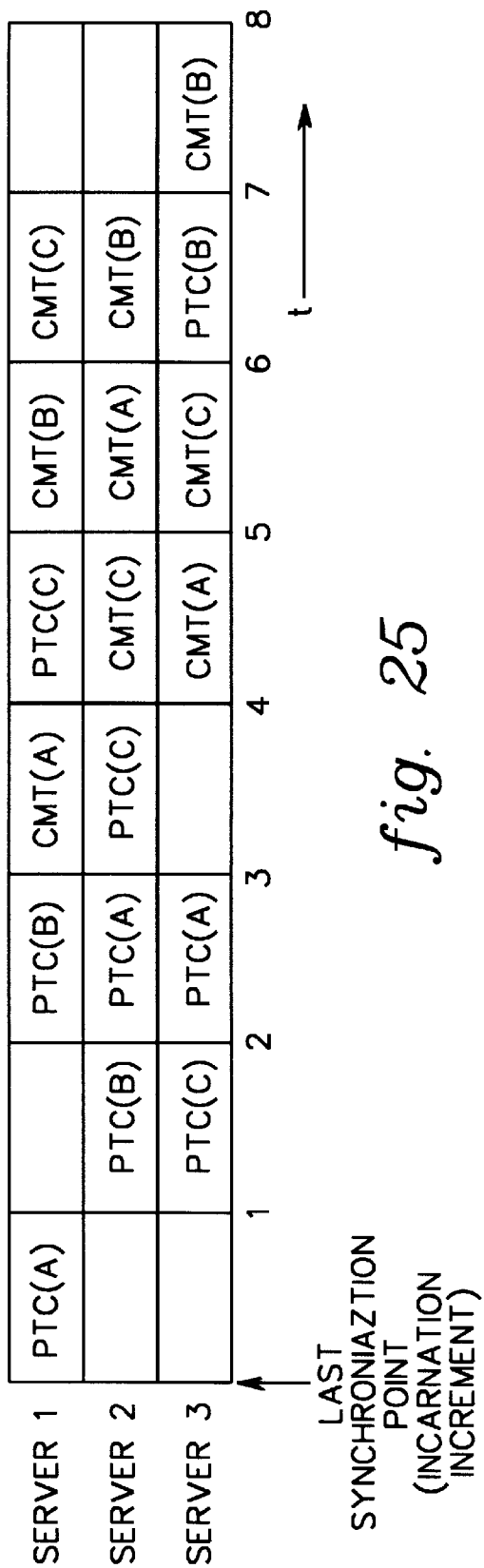
FIG. 25 depicts one example of a snapshot of a distributed system at a particular point in time, in accordance with an aspect of the present invention.

For example, consider a snapshot of the DSTS taken during normal operation at T=4, in FIG. 25. At that point, each server has received the following set of messages:

| Server 1 | Server 2 | Server 3 |
|---|---|---|
| PTC(A) | PTC(B) | PTC(C) |
| PTC(B) | PTC(A) | PTC(A) |
| CMT(A) | PTC(C) | |

Now, assume that Server 2 failed at T=4.

In the event of a failure, one of the surviving members is elected as a group coordinator. In this example, it is assumed that Server 1 is elected as the group coordinator. The group coordinator participates in recovery, as described herein.

Figure 26:
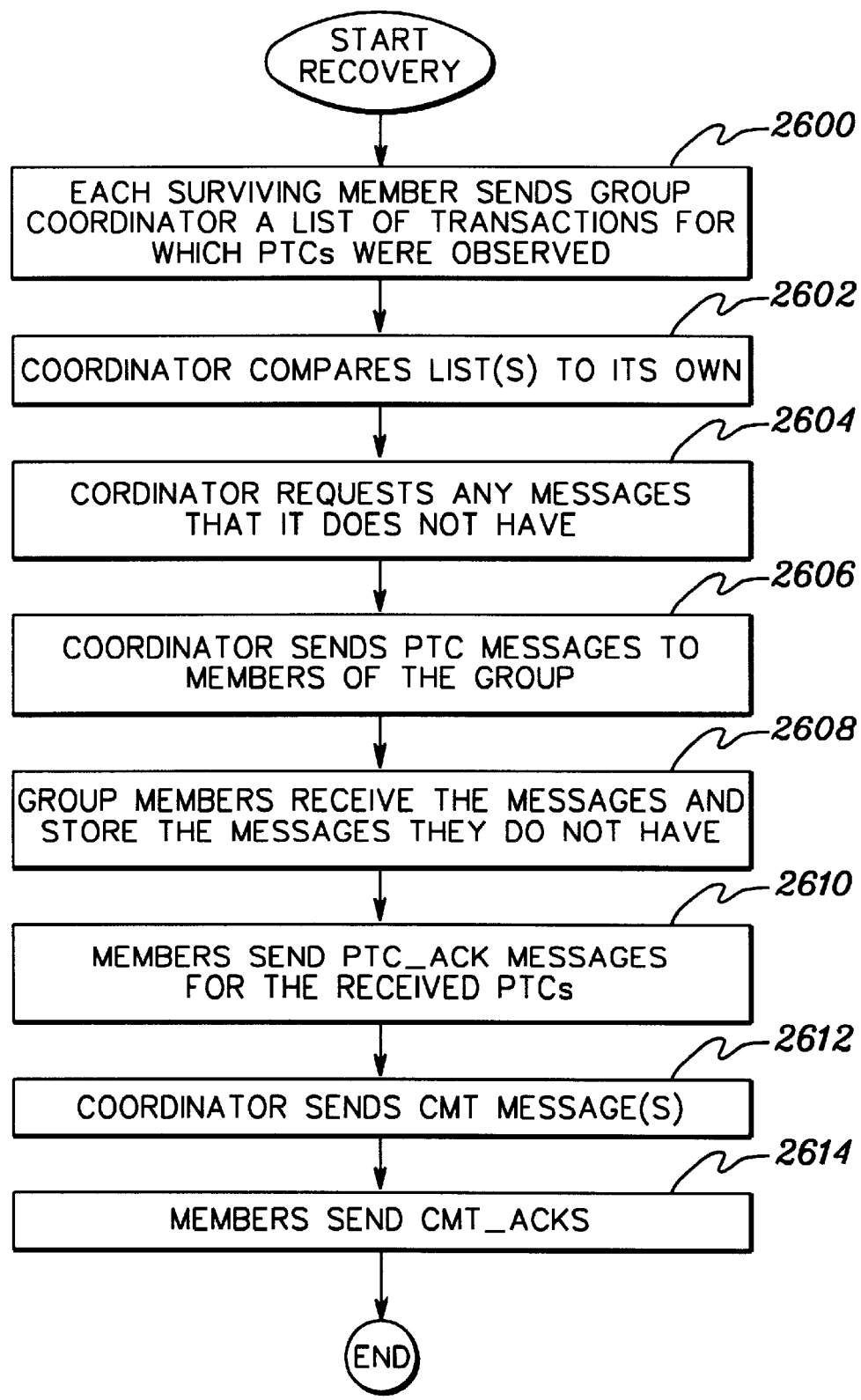
FIG. 26 depicts one embodiment of the logic associated with a recovery procedure, used in accordance with an aspect of the present invention.

One embodiment of the logic associated with a recovery facility is described with reference to FIG. 26. Initially, each surviving member sends to the group coordinator a list of the transaction identifiers for which PTCs were observed, since the last synchronization point, STEP 2600. In this example, Server 3 sends PTC(C) and PCT(A). Subsequently, the group coordinator compares the PTC identifiers sent by the other surviving member(s) with its own list of PTCs, STEP 2602. In this example, the list from Server 3 is compared against {PTC(B) and PTC(A)}.

Next, the group coordinator requests the actual PTC message for any message that was reported by other members, but not received by the coordinator, STEP 2604. For example, the group coordinator, Server 1, requests from Server 3, PTC(C) message. At this point, the group coordinator has knowledge of all pending transactions, since the last synchronization point. The group coordinator now assumes the role of protocol initiator for all pending protocols. The other members of the group know that the protocol initiator role was changed because the system goes into recovery mode when a failure occurs.

The group coordinator sends PTC messages to any other surviving members, for all the PTC messages that are in the union of its PTC list and the other PTC list that it received in STEP 2600, STEP 2606. For example, the group coordinator sends out {PTC(A), PTC(B), PTC(C)}. The surviving group members receive the pending PTCs, and store the ones that they have not yet received, STEP 2608. For example, Server 3 stores PTC(B).

Subsequently, the surviving members send PTC_ACK messages for each of the PTCs that were received, STEP 2610. As the PTC_ACKS are received for the group members for each PTC, the group coordinator sends a commit (CMT) message, STEP 2612. As the surviving members receive the commit message, they send CMT_ACKS messages, STEP 2614. When the CMT_ACKS messages are received for the pending transactions, the DSTS system has reached another synchronization point (i.e., no pending transactions).

Advantageously, the details of the two-phase commit process is hidden from the client application. In particular, the client application has no knowledge that there are other copies of the application involved in the commit process.

Further, advantageously, the recovery technique described above can take more than one failure. That is, it can successfully complete transactions, even if group members continue to fail, and even if the recovery is already in progress, as long as, for instance, a quorum of the group members is maintained. When a failure is noticed, the technique is restarted from the beginning. A transaction may be lost, however, if the initiator of the transaction fails before it can send out any PTC messages, or if all of a majority of the recipients of a PTC message fails after receiving the message. The recovery technique is applicable to all types of applications, even for applications that do not support rollback operations. Further, it is a useful communications protocol for shared nothing distributed systems.

In addition to the above, a failed member can rejoin the group by having the failed member detect the last synchronization point that is observed and obtaining from the current group the delta of transactions that it needs to reach the most recent synchronization point of the DSTS system.

In one embodiment, group membership and group state are employed in the recovery of the DSTS system.

Described above are various aspects of managing replicated distributed synchronous transactions. Advantageously, the replication details are hidden from the client applications (e.g., no voting in two-phase commit, no participation in group protocols). One or more of the aspects of the present invention are applicable to homogeneous systems, as well as heterogeneous systems. As one example, capabilities are provided to facilitate the interoperability of the systems of a heterogeneous environment.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of performing synchronous replication of transactions of a distributed computing environment, said method comprising:

initiating, by an instance of a client application of said distributed computing environment, a transaction within said distributed computing environment;

initiating, by the instance, replication of said transaction, wherein the initiating replication is synchronous to initiating the transaction; and replicating said transaction to at least one other instance of said client application, wherein existence of said other instance is hidden from said instance initiating the transaction and the replication.

2. A system of performing synchronous replication of transactions of a distributed computing environment, said system comprising:

means for initiating, by an instance of a client application of said distributed computing environment, a transaction within said distributed computing environment;

means for initiating, by the instance, replication of said transaction, wherein the initiating replication is synchronous to initiating the transaction; and means for replicating said transaction to at least one other instance of said client application, wherein existence of said other instance is hidden from said instance initiating the transaction and the replication.

3. At least one program storage device readable by a machine, tangibly embodying at least one program of instructions executable by the machine to perform a method of performing synchronous replication of transactions of a distributed computing environment, said method comprising:

initiating, by an instance of a client application of said distributed computing environment, a transaction within said distributed computing environment;

initiating, by the instance, replication of said transaction, wherein the initiating replication is synchronous to initiating the transaction; and replicating said transaction to at least one other instance of said client application, wherein existence of said other instance is hidden from said instance initiating the transaction and the replication.

4. The method of claim 1, wherein the initiating comprises the client application communicating with a distributed synchronous transaction system (DSTS) within the distributed computing environment.

5. The method of claim 4, wherein the replicating comprises the DSTS communicating with the at least one other instance of the client application, and wherein the client application and the at least one other instance together comprise a replicated group.

6. The method of claim 5, further comprising processing the transaction by the replicated group.

7. The method of claim 6, further comprising the DSTS confirming completion of the transaction by a number of the replicated group.

8. The method of claim 7, wherein the number comprises a majority of the replicated group.

9. The method of claim 5, wherein the DSTS comprises a plurality of DSTS instances, and wherein the client application communicating with the DSTS comprises the client application communicating with one of the plurality of DSTS instances.

10. The method of claim 9, wherein the DSTS communicating with the at least one other instance of the client application comprises at least one other of the plurality of DSTS instances communicating with the at least one other instance of the client application.

11. The method of claim 10, wherein the initiating, further comprises causing a request for the transaction to be sent from the client application to the one of the plurality of DSTD instances.

12. The method of claim 11, wherein the one of the plurality of DSTS instances and the at least one other of the plurality of DSTS instances comprise a processing group, and wherein the replicating further comprises distributing the request to the other DSTS instances in the processing group.

13. The method of claim 12, wherein the replicating further comprises the other DSTS instances in the processing group informing the members of the replicated group corresponding to the other DSTS instances in the processing group of the request for the transaction.

14. The method of claim 13, wherein the replicating further comprises the replicated group processing the transaction and each member of the processing group sending results of the processing to the corresponding member of the processing group.

15. The method of claim 14, wherein the replicating further comprises the other DSTS instances in the processing group forwarding the results to the one of the plurality of DSTS instances.

16. The method of claim 15, further comprising the one of the plurality of DSTS instances committing the transaction if the transaction was completed by at least a majority of the replicated group, and aborting the transaction if the transaction was completed by less than a majority of the replicated group.

17. The method of claim 1, wherein processing of the transaction results in a change in state of the client application.

18. The system of claim 2, wherein the means for initiating comprises means for the client application to communicate with a distributed synchronous transaction system (DSTS) within the distributed computing environment.

19. The system of claim 18, wherein the means for replicating comprises means for the DSTS to communicate with the at least one other instance of the client application, and wherein the client application and the at least one other instance together comprise a replicated group.

20. The system of claim 19, further comprising means for processing the transaction by the replicated group.

21. The system of claim 20, further comprising means for the DSTS to confirm completion of the transaction by a number of the replicated group.

22. The system of claim 21, wherein the number comprises a majority of the replicated group.

23. The system of claim 19, wherein the DSTS comprises a plurality of DSTS instances, and wherein the means for the client application to communicate with the DSTS comprises means for the client application to communicate with one of the plurality of DSTS instances.

24. The system of claim 23, wherein the means for DSTS to communicate with the at least one other instance of the client application comprises means for at least one other of the plurality of DSTS instances to communicate with the at least one other instance of the client application.

25. The system of claim 24, wherein the means for initiating further comprises means for causing a request for the transaction to be sent from the client application to the one of the plurality of DSTD instances.

26. The system of claim 25, wherein the one of the plurality of DSTS instances and the at least one other of the plurality of DSTS instances comprise a processing group, and wherein the means for replicating further comprises means for distributing the request to the other DSTS instances in the processing group.

27. The system of claim 26, wherein the means for replicating further comprises means for the other DSTS instances in the processing group to inform the members of the replicated group corresponding to the other DSTS instances in the processing group of the request for the transaction.

28. The system of claim 27, wherein the means for replicating further comprises means for the replicated group to process the transaction and each member of the processing group to send results of the processing to the corresponding member of the processing group.

29. The system of claim 28, wherein the means for replicating further comprises means for the other DSTS instances in the processing group to forward the results to the one of the plurality of DSTS instances.

30. The system of claim 29, further comprising means for the one of the plurality of DSTS instances to commit the transaction if the transaction was completed by at least a majority of the replicated group, and means for aborting the transaction if the transaction was completed by less than a majority of the replicated group.

31. The system of claim 2, wherein processing of the transaction results in a change in state of the client application.

32. The program storage device of claim 3, wherein the initiating comprises the client application communicating with a distributed synchronous transaction system (DSTS) within the distributed computing environment.

33. The program storage device of claim 32, wherein the replicating comprises the DSTS communicating with the at least one other instance of the client application, and wherein the client application and the at least one other instance together comprise a replicated group.

34. The program storage device of claim 33, further comprising processing the transaction by the replicated group.

35. The program storage device of claim 34, further comprising the DSTS confirming completion of the transaction by a number of the replicated group.

36. The program storage device of claim 35, wherein the number comprises a majority of the replicated group.

37. The program storage device of claim 33, wherein the DSTS comprises a plurality of DSTS instances, and wherein the client application communicating with the DSTS comprises the client application communicating with one of the plurality of DSTS instances.

38. The program storage device of claim 37, wherein the DSTS communicating with the at least one other instance of the client application comprises at least one other of the plurality of DSTS instances communicating with the at least one other instance of the client application.

39. The program storage device of claim 38, wherein the initiating further comprises causing a request for the transaction to be sent from the client application to the one of the plurality of DSTD instances.

40. The program storage device of claim 39, wherein the one of the plurality of DSTS instances and the at least one other of the plurality of DSTS instances comprise a processing group, and wherein the replicating further comprises distributing the request to the other DSTS instances in the processing group.

41. The program storage device of claim 40, wherein the replicating further comprises the other DSTS instances in the processing group informing the members of the replicated group corresponding to the other DSTS instances in the processing group of the request for the transaction.

42. The program storage device of claim 41, wherein the replicating further comprises the replicated group processing the transaction and each member of the processing group sending results of the processing to the corresponding member of the processing group.

43. The program storage device of claim 42, wherein the replicating further comprises the other DSTS instances in the processing group forwarding the results to the one of the plurality of DSTS instances.

44. The program storage device of claim 43, further comprising the one of the plurality of DSTS instances committing the transaction if the transaction was completed by at least a majority of the replicated group, and aborting the transaction if the transaction was completed by less than a majority of the replicated group.

45. The program storage device of claim 3, wherein processing of the transaction results in a change in state of the client application.

* * * * *

UNITED STATES PATENT AND TRADEMARK OFFICE
CERTIFICATE OF CORRECTION

PATENT NO. : 6,823,355 B1
DATED : November 23, 2004
INVENTOR(S) : Novaes et al.

It is certified that error appears in the above-identified patent and that said Letters Patent is hereby corrected as shown below:

Column 7,
Line 16, insert the word -- is -- after the word "this"

Signed and Sealed this

Eighth Day of February, 2005

JON W. DUDAS
*Director of the United States Patent and Trademark Office*